US012181033B2

(12) United States Patent
Moulin et al.

(10) Patent No.: US 12,181,033 B2
(45) Date of Patent: Dec. 31, 2024

(54) TRACK SYSTEM WITH A SUPPORT MEMBER

(71) Applicant: Lear Corporation, Southfield, MI (US)

(72) Inventors: Antoine Moulin, Aurec-sur-Loire (FR); Nordine Hamtache, Roche la Moliere (FR)

(73) Assignee: Lear Corporation, Southfield, MI (US)

( * ) Notice: Subject to any disclaimer, the term of this patent is extended or adjusted under 35 U.S.C. 154(b) by 989 days.

(21) Appl. No.: 17/179,166

(22) Filed: Feb. 18, 2021

(65) Prior Publication Data

US 2021/0262173 A1 Aug. 26, 2021

Related U.S. Application Data

(60) Provisional application No. 62/979,812, filed on Feb. 21, 2020.

(51) Int. Cl.
*F16H 55/26* (2006.01)
*B60N 2/015* (2006.01)
(Continued)

(52) U.S. Cl.
CPC ............. *F16H 55/26* (2013.01); *B60N 2/015* (2013.01); *B60N 2/07* (2013.01); *B60N 2/0722* (2013.01);
(Continued)

(58) Field of Classification Search
CPC . F16H 55/26; F16H 1/04; F16H 19/04; F16H 55/17; F16H 57/12; F16H 2019/008; B60N 2/015; B60N 2/07; B60N 2/0722; B60N 2/08; B60N 2/0715; B61B 13/02; B61C 11/04; B61F 9/00; E01B 25/04; H01R 13/187; H01R 13/62911; H01R 33/02; H01R 33/92; H01R 33/94;
(Continued)

(56) References Cited

U.S. PATENT DOCUMENTS 1,962,789 A 6/1934 Simpson
2,126,143 A 8/1938 McGregor
(Continued)

FOREIGN PATENT DOCUMENTS

CH 523159 A 5/1972
CN 1182686 A 5/1998
(Continued)

OTHER PUBLICATIONS

Co-pending U.S. Appl. No. 16/711,661, filed Dec. 12, 2019.
(Continued)

*Primary Examiner* — Anita M King
(74) *Attorney, Agent, or Firm* — McGarry Bair PC

(57) ABSTRACT

A track system may include a track, a support assembly, and a flexible member. The support assembly may include a support member removably and adjustably connected to the track. The flexible member may be connected to the support member. The support member may include a pinion. The flexible member may be adjustable to a first flexible member position in which the pinion and the track are not engaged with one another. The flexible member may be adjustable to a second flexible member position in which the pinion and the track are engaged with one another.

20 Claims, 14 Drawing Sheets

(51) Int. Cl.

| | | |
|---|---|---|
| *B60N 2/07* | (2006.01) | |
| *B60N 2/08* | (2006.01) | |
| *B61B 13/02* | (2006.01) | |
| *B61C 11/04* | (2006.01) | |
| *B61F 9/00* | (2006.01) | |
| *E01B 25/04* | (2006.01) | |
| *F16H 1/04* | (2006.01) | |
| *F16H 19/00* | (2006.01) | |
| *F16H 19/04* | (2006.01) | |
| *F16H 55/17* | (2006.01) | |
| *F16H 57/12* | (2006.01) | |
| *H01R 13/187* | (2006.01) | |
| *H01R 13/629* | (2006.01) | |
| *H01R 33/02* | (2006.01) | |
| *H01R 33/92* | (2006.01) | |
| *H01R 33/94* | (2006.01) | |
| *H01R 39/64* | (2006.01) | |

(52) U.S. Cl.
CPC ............... *B60N 2/08* (2013.01); *B61B 13/02* (2013.01); *B61C 11/04* (2013.01); *B61F 9/00* (2013.01); *E01B 25/04* (2013.01); *F16H 1/04* (2013.01); *F16H 19/04* (2013.01); *F16H 55/17* (2013.01); *F16H 57/12* (2013.01); *H01R 13/187* (2013.01); *H01R 13/62911* (2013.01); *H01R 33/02* (2013.01); *H01R 33/92* (2013.01); *H01R 33/94* (2013.01); *B60N 2/0715* (2013.01); *F16H 2019/008* (2013.01); *H01R 39/64* (2013.01); *H01R 2201/26* (2013.01)

(58) Field of Classification Search
CPC .... H01R 39/64; H01R 2201/26; F16M 13/02; F16M 2201/26
See application file for complete search history.

(56) References Cited

U.S. PATENT DOCUMENTS

| | | | |
|---|---|---|---|
| 2,263,554 A | 11/1941 | Brach | |
| 2,480,622 A | 8/1949 | Warnock | |
| 2,678,082 A | 5/1954 | Nathan | |
| 3,096,066 A | 7/1963 | Granet et al. | |
| 3,181,102 A | 4/1965 | Fehr | |
| 3,213,403 A | 10/1965 | Hermann | |
| 3,268,848 A | 8/1966 | Adams | |
| 3,603,918 A | 9/1971 | Woertz | |
| 3,933,403 A | 1/1976 | Rubesamen et al. | |
| 3,940,182 A | 2/1976 | Tamura | |
| 4,020,769 A | 5/1977 | Keir | |
| 4,154,422 A | 5/1979 | Muhr | |
| 4,198,025 A | 4/1980 | Lowe et al. | |
| 4,238,099 A | 12/1980 | Hunwicks | |
| 4,243,248 A | 1/1981 | Scholz et al. | |
| 4,281,871 A | 8/1981 | Grittner | |
| 4,282,631 A | 8/1981 | Uehara et al. | |
| 4,511,187 A | 4/1985 | Rees | |
| 4,575,295 A | 3/1986 | Rebentisch | |
| 4,618,808 A | 10/1986 | Ish-Shalom et al. | |
| 4,707,030 A | 11/1987 | Harding | |
| 4,711,589 A | 12/1987 | Goodbred | |
| 4,763,360 A | 8/1988 | Daniels et al. | |
| 4,776,809 A | 10/1988 | Hall | |
| 4,804,229 A | 2/1989 | Nishino | |
| 4,830,531 A | 5/1989 | Condit et al. | |
| 4,853,555 A | 8/1989 | Wheat | |
| 4,941,636 A | 7/1990 | Fujiwara et al. | |
| 4,961,559 A | 10/1990 | Raymor | |
| 4,969,621 A | 11/1990 | Munchow et al. | |
| 4,987,316 A | 1/1991 | White et al. | |
| 5,106,144 A | 4/1992 | Hayakawa et al. | |
| 5,137,331 A | 8/1992 | Colozza | |
| 5,167,393 A | 12/1992 | Hayakawa et al. | |
| 5,192,045 A | 3/1993 | Yamada et al. | |
| 5,222,814 A | 6/1993 | Boelryk | |
| 5,302,065 A | 4/1994 | Vogg et al. | |
| 5,322,982 A | 6/1994 | Leger et al. | |
| 5,332,290 A | 7/1994 | Borlinghaus et al. | |
| 5,348,373 A | 9/1994 | Stiennon | |
| 5,362,241 A | 11/1994 | Matsuoka et al. | |
| 5,446,442 A | 8/1995 | Swart et al. | |
| 5,466,892 A | 11/1995 | Howard et al. | |
| 5,489,173 A | 2/1996 | Hofle | |
| 5,524,504 A | 6/1996 | Brandoli et al. | |
| 5,582,381 A | 12/1996 | Graf et al. | |
| 5,599,086 A | 2/1997 | Dutta | |
| 5,618,192 A | 4/1997 | Drury | |
| 5,655,816 A | 8/1997 | Magnuson et al. | |
| 5,676,341 A | 10/1997 | Tarusawa et al. | |
| 5,696,409 A | 12/1997 | Handman et al. | |
| 5,701,037 A | 12/1997 | Weber et al. | |
| 5,785,387 A | 7/1998 | Hernandez et al. | |
| 5,796,177 A | 8/1998 | Werbelow et al. | |
| 5,800,015 A | 9/1998 | Tsuchiya et al. | |
| 5,893,545 A | 4/1999 | Lyons et al. | |
| 5,899,532 A | 5/1999 | Paisley et al. | |
| 5,918,847 A | 7/1999 | Couasnon | |
| 5,921,606 A | 7/1999 | Moradell et al. | |
| 5,931,436 A | 8/1999 | Rohee | |
| 5,964,442 A | 10/1999 | Wingblad et al. | |
| 5,964,815 A | 10/1999 | Wallace et al. | |
| 6,008,547 A | 12/1999 | Dobler et al. | |
| 6,036,157 A | 3/2000 | Baroin et al. | |
| 6,081,044 A | 6/2000 | Anthofer et al. | |
| 6,142,718 A | 11/2000 | Kroll | |
| 6,150,774 A | 11/2000 | Mueller et al. | |
| 6,166,451 A | 12/2000 | Pigott | |
| 6,216,995 B1 | 4/2001 | Koester | |
| 6,227,595 B1 | 5/2001 | Hamelin et al. | |
| 6,260,813 B1 | 7/2001 | Whitcomb | |
| 6,290,516 B1 | 9/2001 | Gerber | |
| 6,296,498 B1 | 10/2001 | Ross | |
| 6,299,230 B1 | 10/2001 | Oettl | |
| 6,318,802 B1 | 11/2001 | Sjostrom et al. | |
| 6,325,645 B1 | 12/2001 | Schuite | |
| 6,357,814 B1 | 3/2002 | Boisset et al. | |
| 6,364,272 B1 | 4/2002 | Schuler et al. | |
| 6,400,259 B1 | 6/2002 | Bourcart et al. | |
| 6,405,988 B1 | 6/2002 | Taylor et al. | |
| 6,422,596 B1 | 7/2002 | Fendt et al. | |
| 6,439,531 B1 | 8/2002 | Severini et al. | |
| 6,480,144 B1 | 11/2002 | Miller et al. | |
| 6,565,119 B2 | 5/2003 | Fogle, Jr. | |
| 6,566,765 B1 | 5/2003 | Nitschke et al. | |
| 6,588,722 B2 | 7/2003 | Eguchi et al. | |
| 6,693,368 B2 | 2/2004 | Schumann et al. | |
| 6,710,470 B2 | 3/2004 | Bauer et al. | |
| 6,719,350 B2 | 4/2004 | Duchateau et al. | |
| 6,736,458 B2 | 5/2004 | Chabanne et al. | |
| 6,772,056 B2 | 8/2004 | Mattes et al. | |
| 6,805,375 B2 | 10/2004 | Enders et al. | |
| 6,851,708 B2 | 2/2005 | Kazmierczak | |
| 6,869,057 B2 | 3/2005 | Matsumoto et al. | |
| 6,882,162 B2 | 4/2005 | Schirmer et al. | |
| 6,960,993 B2 | 11/2005 | Mattes et al. | |
| 7,042,342 B2 | 5/2006 | Luo et al. | |
| 7,083,437 B2 | 8/2006 | Mackness | |
| 7,086,874 B2 | 8/2006 | Mitchell et al. | |
| 7,113,541 B1 | 9/2006 | Lys et al. | |
| 7,156,463 B2 | 1/2007 | Taubmann et al. | |
| 7,159,899 B2 | 1/2007 | Nitschke et al. | |
| 7,170,192 B2 | 1/2007 | Kazmierczak | |
| 7,188,805 B2 | 3/2007 | Henley et al. | |
| 7,207,541 B2 | 4/2007 | Frohnhaus et al. | |
| 7,271,501 B2 | 9/2007 | Dukart et al. | |
| 7,288,009 B2 | 10/2007 | Lawrence et al. | |
| 7,293,831 B2 | 11/2007 | Greene | |
| 7,300,091 B2 | 11/2007 | Nihonmatsu et al. | |
| 7,322,605 B2 | 1/2008 | Ventura et al. | |
| 7,348,687 B2 | 3/2008 | Aichriedler et al. | |

(56) References Cited

U.S. PATENT DOCUMENTS

| | | |
|---|---|---|
| 7,363,194 B2 | 4/2008 | Schlick et al. |
| 7,370,831 B2 | 5/2008 | Laib et al. |
| 7,388,466 B2 | 6/2008 | Ghabra et al. |
| 7,389,960 B2 | 6/2008 | Mitchell et al. |
| 7,416,042 B2 | 8/2008 | Czaykowska et al. |
| 7,434,883 B2 | 10/2008 | Deptolla |
| 7,454,170 B2 | 11/2008 | Goossens et al. |
| 7,455,535 B2 | 11/2008 | Insalaco et al. |
| 7,503,522 B2 | 3/2009 | Henley et al. |
| 7,505,754 B2 | 3/2009 | Kazmierczak et al. |
| 7,523,913 B2 | 4/2009 | Mizuno et al. |
| 7,556,233 B2 | 7/2009 | Gryp et al. |
| 7,560,827 B2 | 7/2009 | Jacas-Miret et al. |
| 7,633,301 B2 | 12/2009 | Steenwyk et al. |
| 7,661,637 B2 | 2/2010 | Mejuhas et al. |
| 7,665,939 B1 | 2/2010 | Cardona |
| 7,739,820 B2 | 6/2010 | Frank |
| 7,744,386 B1 | 6/2010 | Speidel et al. |
| 7,980,525 B2 | 7/2011 | Kostin |
| 7,980,798 B1 | 7/2011 | Kuehn et al. |
| 8,010,255 B2 | 8/2011 | Darraba |
| 8,146,991 B2 | 4/2012 | Stanz et al. |
| 8,278,840 B2 | 10/2012 | Logiudice et al. |
| 8,282,326 B2 | 10/2012 | Krostue et al. |
| 8,376,675 B2 | 2/2013 | Schulze et al. |
| 8,408,631 B2 | 4/2013 | Sandmann et al. |
| 8,463,501 B2 | 6/2013 | Jousse |
| 8,536,928 B1 | 9/2013 | Gagne et al. |
| 8,648,613 B2 | 2/2014 | Ewerhart et al. |
| 8,702,170 B2 | 4/2014 | Abraham et al. |
| 8,757,578 B2 | 6/2014 | Kitamura et al. |
| 8,757,720 B2 | 6/2014 | Hurst, III et al. |
| 8,800,949 B2 | 8/2014 | Schebaum et al. |
| 8,857,778 B2 | 10/2014 | Nonomiya |
| 8,936,526 B2 | 1/2015 | Boutouil et al. |
| 8,967,719 B2 | 3/2015 | Ngiau et al. |
| RE45,456 E | 4/2015 | Sinclair et al. |
| 9,010,712 B2 | 4/2015 | Gray et al. |
| 9,018,869 B2 | 4/2015 | Yuasa et al. |
| 9,045,061 B2 | 6/2015 | Kostin et al. |
| 9,162,590 B2 | 10/2015 | Nagura et al. |
| 9,174,604 B2 | 11/2015 | Wellhoefer et al. |
| 9,242,580 B2 | 1/2016 | Schebaum et al. |
| 9,318,922 B2 | 4/2016 | Hall et al. |
| 9,340,125 B2 | 5/2016 | Stutika et al. |
| 9,346,428 B2 | 5/2016 | Bortolin |
| 9,399,412 B2 | 7/2016 | Kanai |
| 9,422,058 B2 | 8/2016 | Fischer et al. |
| 9,561,770 B2 | 2/2017 | Sievers et al. |
| 9,608,392 B1 | 3/2017 | Destro |
| 9,610,862 B2 | 4/2017 | Bonk et al. |
| 9,663,232 B1 | 5/2017 | Porter et al. |
| 9,673,583 B2 | 6/2017 | Hudson et al. |
| 9,701,217 B2 | 7/2017 | Eckenroth et al. |
| 9,731,628 B1 | 8/2017 | Rao et al. |
| 9,758,061 B2 | 9/2017 | Pluta et al. |
| 9,789,834 B2 | 10/2017 | Rapp et al. |
| 9,796,304 B2 | 10/2017 | Salter et al. |
| 9,815,425 B2 | 11/2017 | Rao et al. |
| 9,821,681 B2 | 11/2017 | Rao et al. |
| 9,840,220 B2 | 12/2017 | Van Buskirk et al. |
| 9,879,458 B2 | 1/2018 | Gabriel et al. |
| 9,919,624 B2 | 3/2018 | Cziomer et al. |
| 9,950,682 B1 | 4/2018 | Gramenos et al. |
| 10,059,229 B2 | 7/2018 | Weinschenk, III |
| 10,059,232 B2 | 8/2018 | Frye et al. |
| 10,160,351 B2 | 12/2018 | Sugimoto et al. |
| 10,220,731 B2 | 3/2019 | Kume |
| 10,479,227 B2 | 11/2019 | Nolte et al. |
| 10,486,554 B2 | 11/2019 | Napau |
| 10,493,243 B1 | 12/2019 | Braham |
| 10,547,135 B2 | 1/2020 | Sugiura |
| 10,549,659 B2 | 2/2020 | Sullivan et al. |
| 10,562,414 B2 * | 2/2020 | Condamin ............ B60R 22/22 |
| 10,583,752 B2 | 3/2020 | Higuchi |
| 10,654,378 B2 | 5/2020 | Pons |
| 10,857,910 B2 * | 12/2020 | Madhu ............ B60N 2/02246 |
| 11,358,497 B2 * | 6/2022 | Moulin ............ B60N 2/0806 |
| 2002/0056798 A1 | 5/2002 | Eguchi |
| 2005/0046367 A1 | 3/2005 | Wevers et al. |
| 2005/0089367 A1 | 4/2005 | Sempliner |
| 2005/0150705 A1 | 7/2005 | Vincent et al. |
| 2005/0211835 A1 | 9/2005 | Henley et al. |
| 2005/0215098 A1 | 9/2005 | Muramatsu et al. |
| 2005/0230543 A1 | 10/2005 | Laib et al. |
| 2005/0236899 A1 | 10/2005 | Kazmierczak |
| 2005/0258676 A1 | 11/2005 | Mitchell et al. |
| 2006/0131470 A1 | 6/2006 | Yamada et al. |
| 2006/0208549 A1 | 9/2006 | Hancock et al. |
| 2006/0220411 A1 | 10/2006 | Pathak et al. |
| 2008/0021602 A1 | 1/2008 | Kingham et al. |
| 2008/0084085 A1 | 4/2008 | Mizuno et al. |
| 2008/0090432 A1 | 4/2008 | Patterson et al. |
| 2009/0014584 A1 | 1/2009 | Rudduck et al. |
| 2009/0129105 A1 | 5/2009 | Kusu et al. |
| 2009/0251920 A1 | 10/2009 | Kino et al. |
| 2009/0302665 A1 | 12/2009 | Dowty |
| 2009/0319212 A1 | 12/2009 | Cech et al. |
| 2010/0117275 A1 | 5/2010 | Nakamura |
| 2011/0024595 A1 | 2/2011 | Oi et al. |
| 2011/0169294 A1* | 7/2011 | Sandmann ............ B60N 2/123<br>296/65.15 |
| 2011/0225773 A1 | 9/2011 | Hearn et al. |
| 2012/0001049 A1 | 1/2012 | Selbold |
| 2012/0112032 A1 | 5/2012 | Kohen |
| 2013/0020459 A1 | 1/2013 | Moriyama et al. |
| 2013/0035994 A1 | 2/2013 | Pattan et al. |
| 2013/0153735 A1 | 6/2013 | Ruthman et al. |
| 2013/0334390 A1 | 12/2013 | Schebaum |
| 2013/0341479 A1 | 12/2013 | Yamada et al. |
| 2014/0110554 A1 | 4/2014 | Oya et al. |
| 2014/0224954 A1 | 8/2014 | Oh et al. |
| 2014/0263920 A1 | 9/2014 | Anticuar et al. |
| 2014/0265479 A1 | 9/2014 | Bennett |
| 2014/0291473 A1 | 10/2014 | Mischer |
| 2015/0048206 A1 | 2/2015 | Deloubes |
| 2015/0052819 A1 | 2/2015 | Lee |
| 2015/0069807 A1 | 3/2015 | Kienke |
| 2015/0083882 A1 | 3/2015 | Stutika et al. |
| 2015/0191106 A1 | 7/2015 | Inoue et al. |
| 2015/0236462 A1 | 8/2015 | Davidson, Jr. et al. |
| 2015/0298580 A1 | 10/2015 | Kanai |
| 2016/0039314 A1 | 2/2016 | Anticuar et al. |
| 2016/0154170 A1 | 6/2016 | Thompson et al. |
| 2016/0181708 A1 | 6/2016 | Busse |
| 2016/0236613 A1 | 8/2016 | Trier |
| 2017/0080825 A1 | 3/2017 | Bonk et al. |
| 2017/0080826 A1 | 3/2017 | Bonk et al. |
| 2017/0166091 A1 | 6/2017 | Cziomer |
| 2017/0166093 A1 | 6/2017 | Cziomer et al. |
| 2017/0261343 A1 | 9/2017 | Lanter et al. |
| 2017/0291507 A1 | 10/2017 | Hattori et al. |
| 2018/0017189 A1 | 1/2018 | Wegner |
| 2018/0039917 A1 | 2/2018 | Buttolo et al. |
| 2018/0058122 A1 | 3/2018 | Lang |
| 2018/0072188 A1 | 3/2018 | Yamada |
| 2018/0086230 A1 | 3/2018 | Kume et al. |
| 2018/0086232 A1 | 3/2018 | Kume |
| 2018/0105072 A1 | 4/2018 | Pons |
| 2018/0126875 A1 | 5/2018 | Kume et al. |
| 2018/0148011 A1 | 5/2018 | Zaugg et al. |
| 2018/0154799 A1 | 6/2018 | Lota |
| 2018/0183623 A1 | 6/2018 | Schoenfeld et al. |
| 2018/0244175 A1 | 8/2018 | Tan |
| 2018/0275648 A1 | 9/2018 | Ramalingam |
| 2019/0001846 A1 | 1/2019 | Jackson et al. |
| 2019/0084453 A1 | 3/2019 | Petit et al. |
| 2019/0126786 A1 | 5/2019 | Dry et al. |
| 2019/0337413 A1 | 11/2019 | Romer |
| 2019/0337414 A1 | 11/2019 | Condamin et al. |
| 2019/0337415 A1* | 11/2019 | Condamin ............ B60N 2/0715 |
| 2019/0337416 A1 | 11/2019 | Condamin et al. |
| 2019/0337417 A1 | 11/2019 | Condamin et al. |
| 2019/0337418 A1 | 11/2019 | Condamin et al. |

(56) References Cited

U.S. PATENT DOCUMENTS

| | | |
|---|---|---|
| 2019/0337419 A1 | 11/2019 | Condamin et al. |
| 2019/0337420 A1 | 11/2019 | Condamin et al. |
| 2019/0337421 A1 | 11/2019 | Condamin et al. |
| 2019/0337422 A1 | 11/2019 | Condamin et al. |
| 2019/0337471 A1 | 11/2019 | Brehm |
| 2019/0379187 A1 | 12/2019 | Christensen et al. |
| 2019/0389336 A1 | 12/2019 | Malinowski et al. |
| 2020/0009995 A1 | 1/2020 | Sonar |
| 2020/0010001 A1 | 1/2020 | Pinkelman et al. |
| 2020/0047641 A1 | 2/2020 | D'Eramo et al. |
| 2020/0055423 A1 | 2/2020 | Prozzi et al. |
| 2020/0079244 A1 | 3/2020 | Carbone et al. |
| 2020/0180516 A1 | 6/2020 | Moulin |
| 2020/0180517 A1 | 6/2020 | Moulin |
| 2020/0189504 A1 | 6/2020 | Ricart et al. |
| 2020/0189511 A1 | 6/2020 | Ricart et al. |
| 2020/0194936 A1 | 6/2020 | Ricart et al. |
| 2020/0194948 A1 | 6/2020 | Lammers et al. |
| 2020/0207241 A1 | 7/2020 | Moulin et al. |
| 2020/0247275 A1 | 8/2020 | Yetukuri et al. |
| 2020/0262367 A1 | 8/2020 | Fernandez Banares et al. |
| 2020/0269754 A1 | 8/2020 | Ricart et al. |
| 2020/0282871 A1 | 9/2020 | Ricart et al. |
| 2020/0282880 A1 | 9/2020 | Jones et al. |
| 2021/0101562 A1 | 4/2021 | Ricart et al. |
| 2021/0105011 A1 | 4/2021 | Ricart et al. |
| 2021/0105012 A1 | 4/2021 | Ricart et al. |
| 2021/0107419 A1 | 4/2021 | Ricart et al. |
| 2021/0129710 A1 | 5/2021 | Petit et al. |
| 2021/0129778 A1 | 5/2021 | Fernandez Banares et al. |
| 2021/0262560 A1* | 8/2021 | Moulin .................. F16H 55/26 |

FOREIGN PATENT DOCUMENTS

| | | |
|---|---|---|
| CN | 201272262 Y | 7/2009 |
| CN | 203190203 U | 9/2013 |
| CN | 103380024 A | 10/2013 |
| CN | 203799201 U | 8/2014 |
| CN | 104071039 A | 10/2014 |
| CN | 104487282 A | 4/2015 |
| CN | 104648190 A | 5/2015 |
| CN | 206287857 U | 6/2017 |
| CN | 106965712 A | 7/2017 |
| CN | 106994917 A | 8/2017 |
| CN | 107614316 A | 1/2018 |
| CN | 107867204 A | 1/2018 |
| CN | 107706680 A | 2/2018 |
| CN | 107804196 A | 3/2018 |
| CN | 107867205 A | 4/2018 |
| CN | 109070771 A | 12/2018 |
| CN | 208640054 U | 3/2019 |
| CN | 109878384 A | 6/2019 |
| CN | 110435487 A | 11/2019 |
| CN | 110435493 A | 11/2019 |
| CN | 110435494 A | 11/2019 |
| CN | 209599576 U | 11/2019 |
| DE | 2004504 A1 | 8/1971 |
| DE | 19509344 A1 | 9/1996 |
| DE | 19602250 A1 | 7/1997 |
| DE | 10143721 A1 | 3/2003 |
| DE | 60100054 T2 | 7/2003 |
| DE | 202005013714 U1 | 12/2005 |
| DE | 102005007430 A1 | 3/2006 |
| DE | 102006022032 A1 | 12/2006 |
| DE | 102009059126 A1 | 7/2010 |
| DE | 102010017038 A1 | 2/2011 |
| DE | 102011002656 A1 | 9/2011 |
| DE | 102011056278 A1 | 2/2013 |
| DE | 202014102336 U1 | 6/2014 |
| DE | 102013109653 A1 | 3/2015 |
| DE | 102015212100 A1 | 12/2015 |
| DE | 102016113409 A1 | 4/2017 |
| DE | 102015221077 A1 | 5/2017 |
| DE | 102017210396 A1 | 12/2017 |
| DE | 102019206304 A1 | 11/2019 |
| DE | 102019206411 A1 | 11/2019 |
| DE | 102020128572 A1 | 5/2021 |
| DE | 102019135631 A1 | 6/2021 |
| EP | 0074754 A2 | 3/1983 |
| EP | 0090235 A2 | 10/1983 |
| EP | 0783990 A1 | 7/1997 |
| EP | 1176047 A1 | 1/2002 |
| EP | 2298609 B1 | 3/2011 |
| EP | 3150426 A1 | 4/2017 |
| EP | 3456579 A1 | 3/2019 |
| FR | 2762814 A1 | 11/1998 |
| FR | 2951329 A1 | 4/2011 |
| FR | 2986751 A1 | 8/2013 |
| JP | 2001500307 A | 1/2001 |
| JP | 3314591 B2 | 8/2002 |
| JP | 2003227703 A | 8/2003 |
| JP | 2004103346 A | 4/2004 |
| JP | 2005119518 A | 5/2005 |
| JP | 2007112174 A | 5/2007 |
| JP | 2008158578 A | 7/2008 |
| JP | 4222262 B2 | 2/2009 |
| JP | 2009200023 A | 9/2009 |
| JP | 2009202813 A | 9/2009 |
| JP | 2013230721 A | 11/2013 |
| JP | 2019098789 A | 6/2019 |
| JP | 2020023292 A | 2/2020 |
| KR | 20100044775 A | 4/2010 |
| WO | 01/87665 A1 | 11/2001 |
| WO | 2003002256 A2 | 1/2003 |
| WO | 2005/068247 A2 | 7/2005 |

OTHER PUBLICATIONS

Co-pending U.S. Appl. No. 17/078,706, filed Oct. 23, 2020.
Co-pending U.S. Appl. No. 17/116,959, filed Dec. 9, 2020.
Co-pending U.S. Appl. No. 17/179,147, filed Feb. 18, 2021.
Co-pending U.S. Appl. No. 17/179,159, filed Feb. 18, 2021.
Co-pending U.S. Appl. No. 17/179,170, filed Feb. 18, 2021.
Co-pending U.S. Appl. No. 17/179,176, filed Feb. 18, 2021.
Co-pending U.S. Appl. No. 17/179,144, filed Feb. 18, 2021.
German Office Action dated Sep. 23, 2021 related to corresponding German Patent No. 10 2021 104 008.6.
Chinese Office Action dated Nov. 18, 2022 for Chinese Patent Application No. 202110199284.1.

* cited by examiner

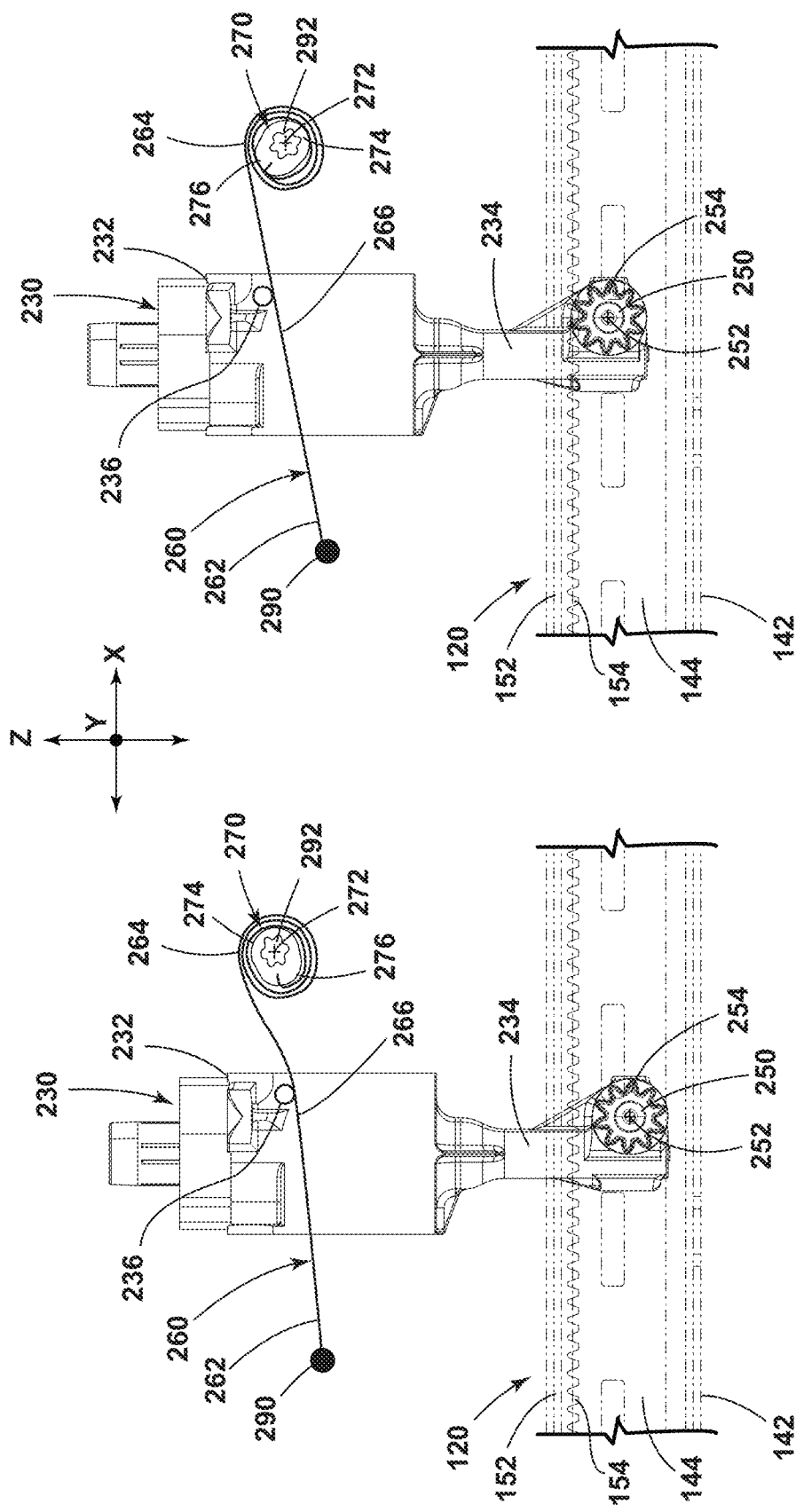

# TRACK SYSTEM WITH A SUPPORT MEMBER

CROSS-REFERENCE TO RELATED APPLICATION

This application claims the benefit of U.S. Provisional Patent Application Ser. No. 62/979,812, filed on Feb. 21, 2020, the disclosure of which is hereby incorporated by reference in its entirety as though fully set forth herein.

TECHNICAL FIELD

The present disclosure generally relates to a track/rail system and/or support members configured for connection with, movement along/relative to, and removal from tracks/rails, including support members and tracks/rails that may, for example, be utilized in connection with vehicle seats.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some track systems may have support members that may not provide sufficient functionality, may be complex to operate and/or assemble, and/or may not operate efficiently. For example, some support members may not effectively and/or efficiently engage a track of a track assembly.

There is a desire for solutions/options that minimize or eliminate one or more challenges or shortcomings of track systems. The foregoing discussion is intended only to illustrate examples of the present field and is not a disavowal of scope.

SUMMARY

In embodiments, a track system may include a track/rail, a support assembly, and/or a flexible member. The support assembly may include a support member removably and adjustably connected to the track. The flexible member may be connected to the support member. The support member may include a pinion. The flexible member may be adjustable to a first flexible member position in which the pinion is disengaged from the track. The flexible member may be adjustable to a second flexible member position in which the pinion is engaged with the track.

In embodiments, a method of operating a track system may include connecting the support member and the track assembly. A method may include engaging the pinion and the track via adjusting the flexible member from a first flexible member position to a second flexible member position.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

FIGS. 9A and 9B generally illustrate an embodiment of a support member in which a pinion is in a disengaged position and an engaged position, respectively, according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1:
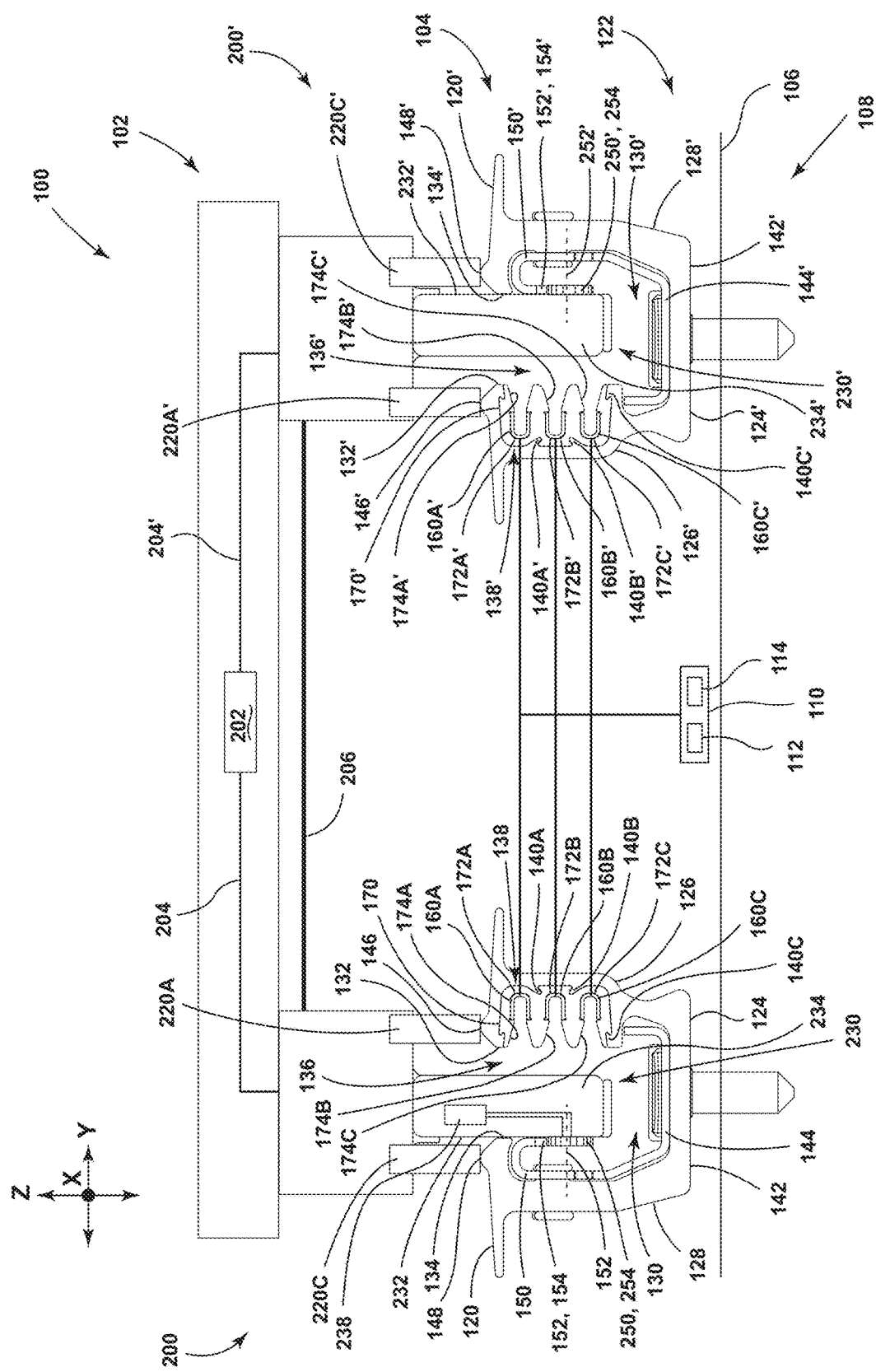
FIG. 1 is a cross sectional view generally illustrating an embodiment of a track system according to teachings of the present disclosure.

In embodiments, such as generally illustrated in FIG. 1, a track system 100 may include a support assembly 102 and/or a track/rail assembly 104. A track assembly 104 may be connected to and/or disposed in a mounting surface 106 (e.g., a floor of a vehicle 108) and may facilitate selective connection of one or more support assemblies 102 to the mounting surface 106. A track assembly 104 may facilitate adjustment of one or more support assemblies 102, such as relative to the mounting surface 106 and/or within a vehicle 108. A support assembly 102 and/or a track assembly 104 may include and/or be connected to an electrical system 110 (e.g., of a vehicle 108), which may include a controller 112 and/or a power source 114.

In embodiments, such as generally illustrated in FIG. 1, a track assembly 104 may include one or more tracks/rails 120 to which a support assembly 102 may be connectable and adjustable (e.g., slidable). A track 120 may include one or more metal and/or conductive materials (e.g., steel, aluminum, etc.). A track assembly 104 may include one or more track sets 122, each including one or more tracks 120 that may be configured to engage a corresponding portion of a support assembly 102. Several tracks 120 and/or track sets 122 may be connected to a portion of the mounting surface 106 (e.g., a floor, wall, ceiling, etc.) and disposed adjacent to one another and/or may extend parallel to one another. One or more tracks 120, 120' may be structured identically to one other and/or differently from one another. Tracks 120, 120' may, for example, be offset from each other in a lateral/transverse direction (e.g., a Y-direction) such that the tracks 120, 120' may be generally aligned with respective outer sides of the support assembly 102.

Figure 2:
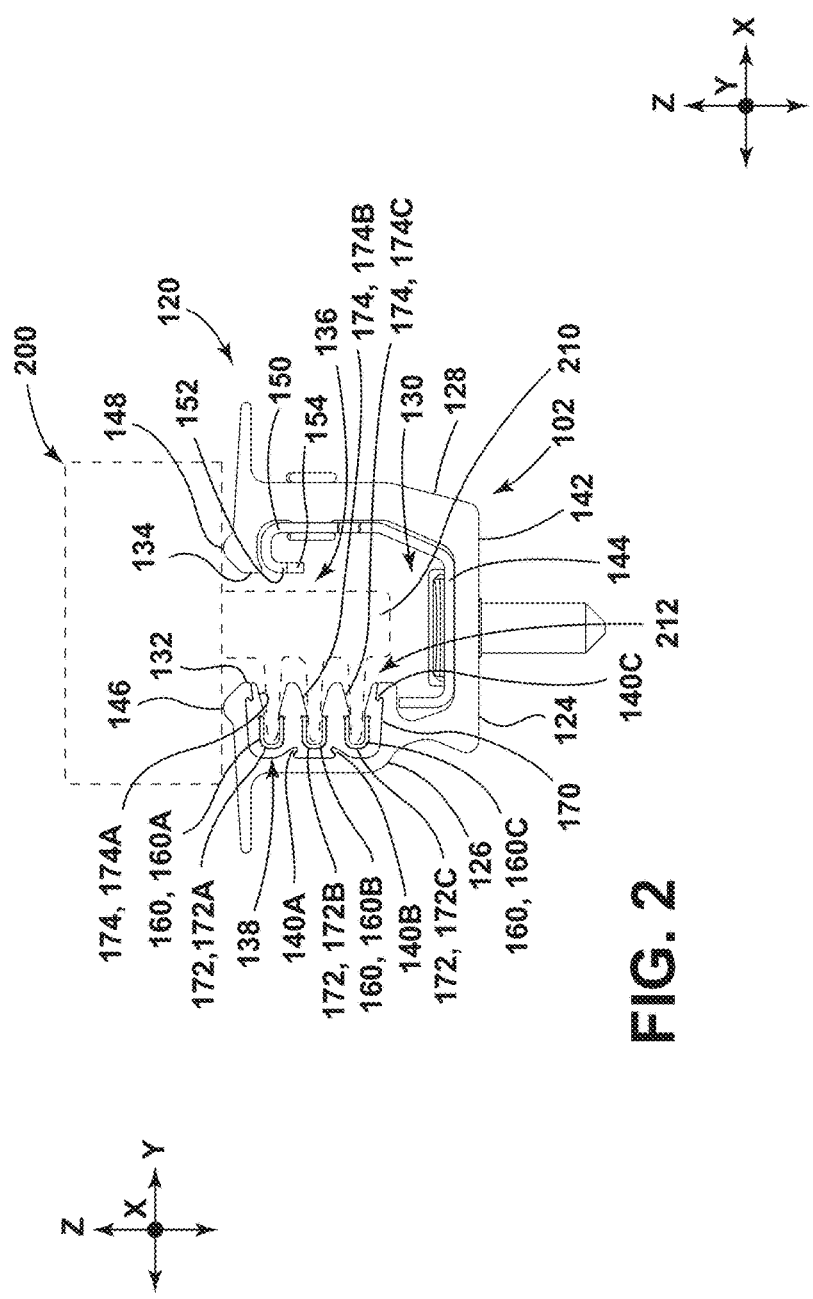
FIG. 2 is a cross-sectional view generally illustrating an embodiment of a track and an electrical connector according to teachings of the present disclosure.

With embodiments, such as generally illustrated in FIG. 2, a track 120 may be an elongated member extending in the X-direction. A track 120 may have a track base portion 124 and two track wall portions (e.g., a first track wall portion 126 and a second track wall portion 128) protruding from the track base portion 124 to form a generally U shaped cross-section in a Y-Z plane (e.g., in a plane perpendicular to an X-direction). The U-shaped cross section may define a track receptacle 130 configured to receive and/or at least temporarily retain a portion of a support assembly 102. A first track lip/wing 132 and a second track lip/wing 134 may project inwardly toward one another from the first track wall portion 126 and the second track wall portion 128, respectively. A track opening 136 may be defined between the two track lips 132, 134. A portion of a support assembly 102 may be inserted into the track opening 136 and selectively retained within the track receptacle 130. A track 120 may include an insulator receptacle 138 configured to receive and retain an insulator 170. An insulator receptacle 138 may open substantially in a Y-direction. An insulator receptacle 138 may be defined by a track wall portion 126, 128, a track lip 132, 134, and/or one or more track projections 140A, 140B, 140C extending from a track wall portion 126, 128. Additionally and/or alternatively, an insulator receptacle 138 may be defined by a track wall portion 126, 128, a track lip 132, 134, and/or a track base portion 124.

Figure 3:
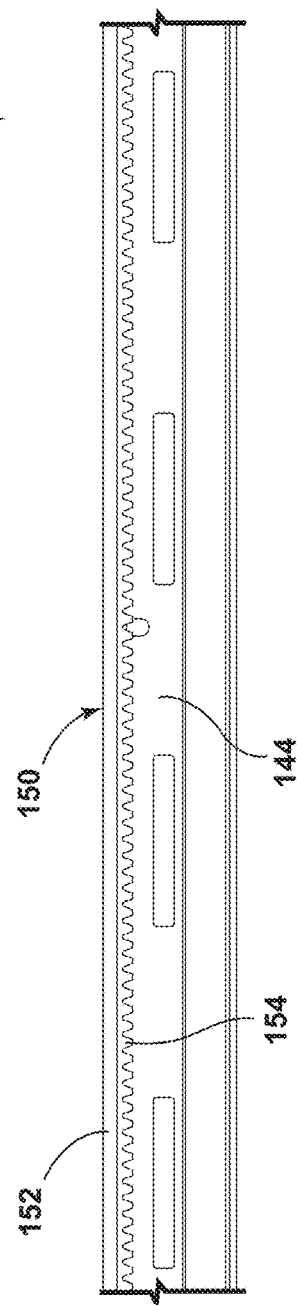
FIG. 3 generally illustrates an embodiment of an inner track according to teachings of the present disclosure.

With embodiments, such as generally illustrated in FIGS. 1-3, a track 120 may include an outer track 142 and/or an inner track 144. An outer track 142 and/or an inner track 144 may facilitate movement and/or adjustment of a support assembly 102 and/or a support member 200 along a track assembly 104 and/or a track 120. For example and without limitation, a support member 200 may roll along a top surface of an outer track 142 via one or more rolling members 220, and/or a support member 200 may selectively engage the outer track 142 and/or the inner track 144 to selectively restrict/control relative movement between a support assembly 102 and a track 120. An outer track 142 and/or an inner track 144 may include one or more of a variety of materials. For example and without limitation, the outer track 142 may include a first material (e.g., aluminum) that may be relatively light, and/or the inner track 144 may include a second material (e.g., steel) that may be relatively strong compared to the first material.

With embodiments, such as generally illustrated in FIGS. 1 and 2, an outer track 142 may include and/or be defined by one or more portions and/or components of a track 120 (e.g., a track base portion 124, one or more track wall portions 126, 128, one or more track lips 132, 134, and/or one or more track projections 140A, 140B, 140C). An outer track 142 may include and/or define a track receptacle 130, a track opening 136, and/or an insulator receptacle 138. An outer track 142 may include a first rolling portion 146 and/or a second rolling portion 148, which may be configured to engage one or more rolling members 220 of a support member 200. A first rolling portion 146 may be disposed on and/or adjacent to a first track lip 132 (e.g., at or about a top surface of the outer track 142). A second rolling portion 148 may be disposed on and/or adjacent to a second track lip 134. A first rolling portion 146 and/or the second rolling portion 148 may be configured as a ridge, for example, protruding from a track 120 in a Z-direction and/or may extend substantially in an X-direction.

With embodiments, such as generally illustrated in FIGS. 1-3, an inner track 144 may be disposed partially and/or completely within a track receptacle 130. An inner track 144 may be disposed on an/or connected (e.g., fixed) to a track base portion 124 and/or one or more track wall portions 126, 128 of an outer track 142. An inner track 144 may include a generally L-shaped cross section. An inner track 144 may include a hook portion 150, which may be disposed adjacent to and/or extend adjacent to a second track wall portion 128 and/or a second track lip 134.

With embodiments, such as generally illustrated in FIG. 3, a track 120 may include one or more toothed portions 152 (e.g., gear racks) configured to engage a pinion 250 of an adjuster assembly 230. A toothed portion 152 may each include one or more track teeth 154. A toothed portion 152 may generally extend in an X-direction. One or more (e.g., all) of the track teeth 154 may be disposed one after another and/or aligned within one another in an X-direction. Track teeth 154 may extend and/or protrude from the toothed portion 152 generally in a Z-direction (e.g., downward in the Z-direction toward the mounting surface 106). A toothed portion 152 may be disposed within a track receptacle 130 and/or may be disposed on an underside of a track 120. A toothed portion 152 may be connected to and/or formed as a portion of an outer track 142 and/or an inner track 144. For example and without limitation, a toothed portion 152 may be connected to and/or integrally formed with an inner track 144, such as at or about a distal end of a hook portion 150. A toothed portion 152 and/or track teeth 154 may be disposed adjacent to and/or substantially aligned/overlapping (e.g., in a Z-direction) with an edge of a second track lip 134 that at least partially defines a track opening 136.

In embodiments, such as generally illustrated in FIGS. 1 and 2, a track 120 may include one or more electrical conductors 160 (e.g., bus bars). A conductor 160 may be operatively connected to a controller 112 and/or a power source 114. A conductor 160 may be connected to a first track wall portion 126 and/or a second track wall portion 128 of a track 120, and/or another portion of a track 120. A conductor 160 may be connected to a track 120 such that the conductor 160 is able to make contact with (e.g., electrically connect with) a corresponding electrical contact 212 of a support assembly 102. With examples, a conductor 160 may be an elongated member extending in the X-direction and/or may have a generally U-shaped cross section that opens in a Y-direction. A track 120 may include a plurality of conductors 160, such as a first conductor 160A, a second conductor 160B, and/or a third conductor 160C. The first, second, and third conductors 160A, 160B, 160C may be arranged in a stacked configuration such that they are substantially aligned when viewed from a Z-direction and/or extend parallel to one another in the X-direction.

With embodiments, such as generally illustrated in FIGS. 1 and 2, a track 120 may include an insulator 170, that may, for example, include electrically insulative material. An insulator 170 may be disposed within the track receptacle 130 and/or may be connected to the first track wall portion 126 and/or the second track wall portion 128, and/or another portion of the track 120. The insulator 170 may slide and/or snap into an insulator receptacle 138 of a track 120. An insulator 170 may include a body/structure configured to receive and/or retain one or more conductors 160. An insulator 170 may be electrically insulative and/or may be configured to electrically insulate/isolate a conductor 160 from other portions of the track 120 and/or track assembly 104. An insulator 170 may be an elongated body that may extend in the X-direction. An insulator 170 may include one or more insulator recesses 172 configured to receive one or more conductors 160. A conductor 160 may slide and/or snap, for example, into an insulator recess 172. An insulator recess 172 may open in a Y-direction and/or may include a tapered opening 174. An insulator 170 may include a plurality of insulator recesses 172 and/or a plurality of tapered openings 174, such as a first insulator recess 172A, a second insulator recess 172B, and/or a third insulator recess 172C that may each have a respective tapered opening 174A, 174B, 174C. The first insulator recess 172A, the second insulator recess 172B, and the third insulator recess 172C may be configured to receive and/or retain a first conductor 160A, a second conductor 160B, and/or a third conductor 160C, respectively. The first, second, and third insulator recesses 172A, 172B, 172C may be arranged in a stacked configuration such that they are substantially aligned when viewed from a Z-direction and/or extend parallel to one another in the X-direction.

In embodiments, such as generally illustrated in FIG. 1, a track assembly 104 may include a track set 122 including a first track 120 and a second track 120'. The first track 120 may include a track base portion 124, a first track wall portion 126, a second track wall portion 128, a first track lip 132, a second track lip 134, a track receptacle 130, a track opening 136, an insulator receptacle 138, a plurality of track projections 140A, 140B, 140C, an outer track 142, an inner track 144, a first rolling portion 146, a second rolling portion 148, a hook portion 150, a toothed portion 152, and/or track teeth 154. The first track 120 may include an insulator 170 with a plurality of insulator recesses 172A, 172B, 172C and/or a plurality of electrical conductors 160A, 160B, 160C. The second track 120' may include a track base portion 124', a first track wall portion 126', a second track wall portion 128', a first track lip 132', a second track lip 134', a track receptacle 130', a track opening 136', a plurality of track projections 140A', 140B', 140C', an outer track 142', an inner track 144', a first rolling portion 146', a second rolling portion 148', a hook portion 150', a toothed portion 152', track teeth 154', an insulator 170', a plurality of insulator recesses 172A', 172B', 172C', and/or a plurality of electrical conductors 160A', 160B', 160C', some or all of which may be configured in the same or similar manner as corresponding features of the first track 120.

Figure 4:
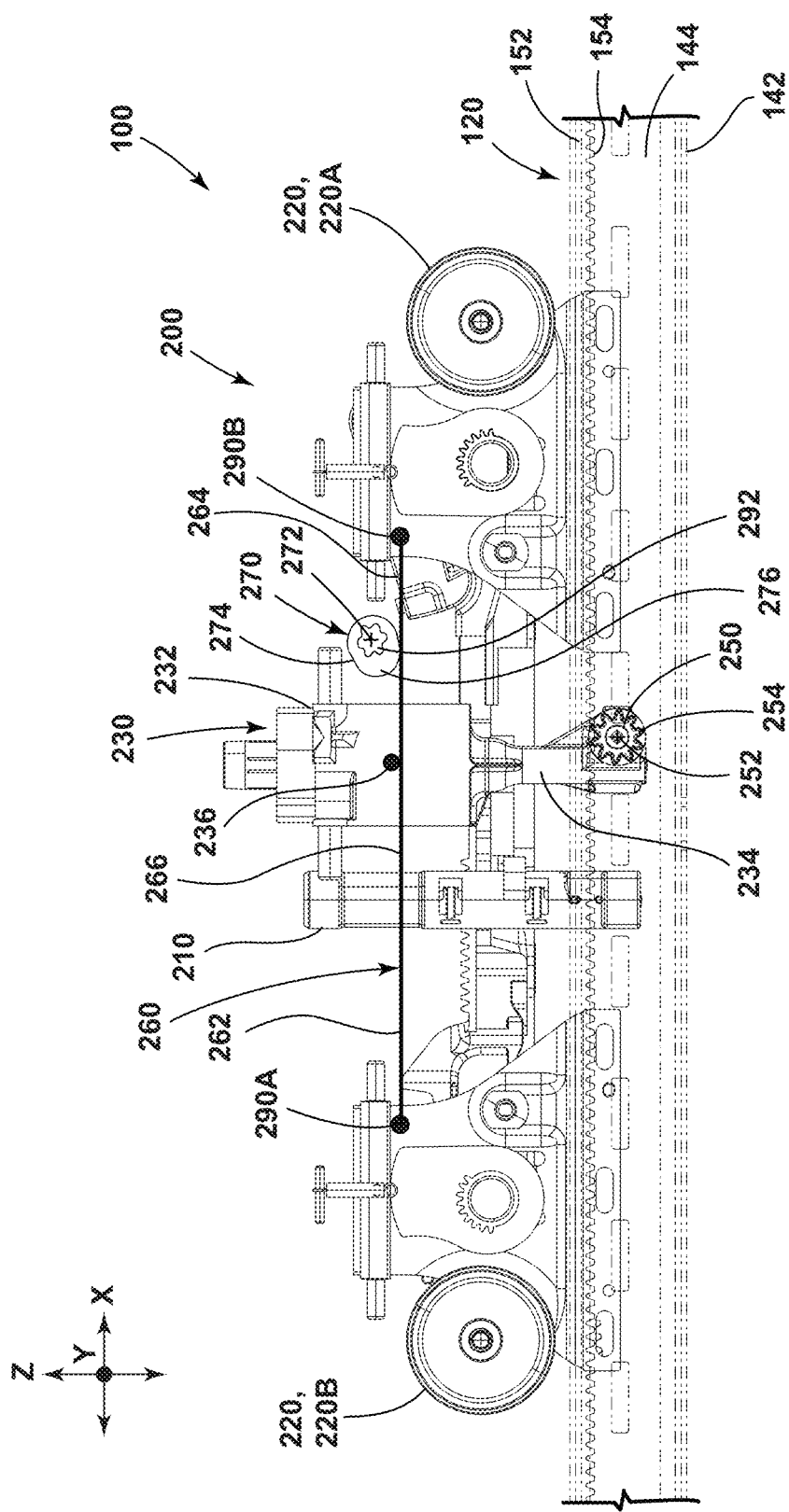
FIG. 4 is a side view generally illustrating an embodiment of a support member and track according to teachings of the present disclosure.
Figure 5:
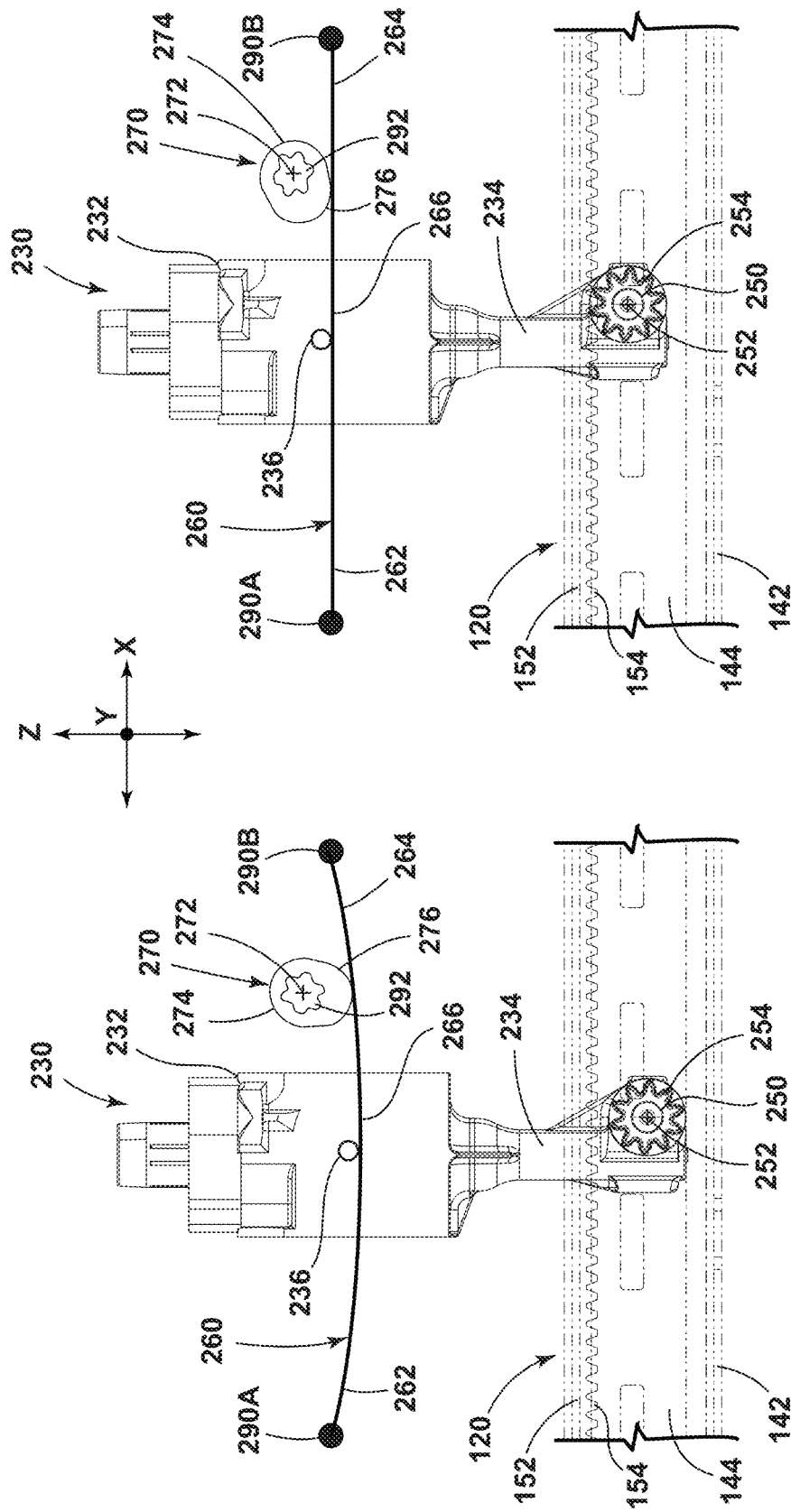
FIGS. 5A and 5B generally illustrate an embodiment of a support member in which a pinion is in a disengaged position and an engaged position, respectively, according to teachings of the present disclosure.
Figure 6:
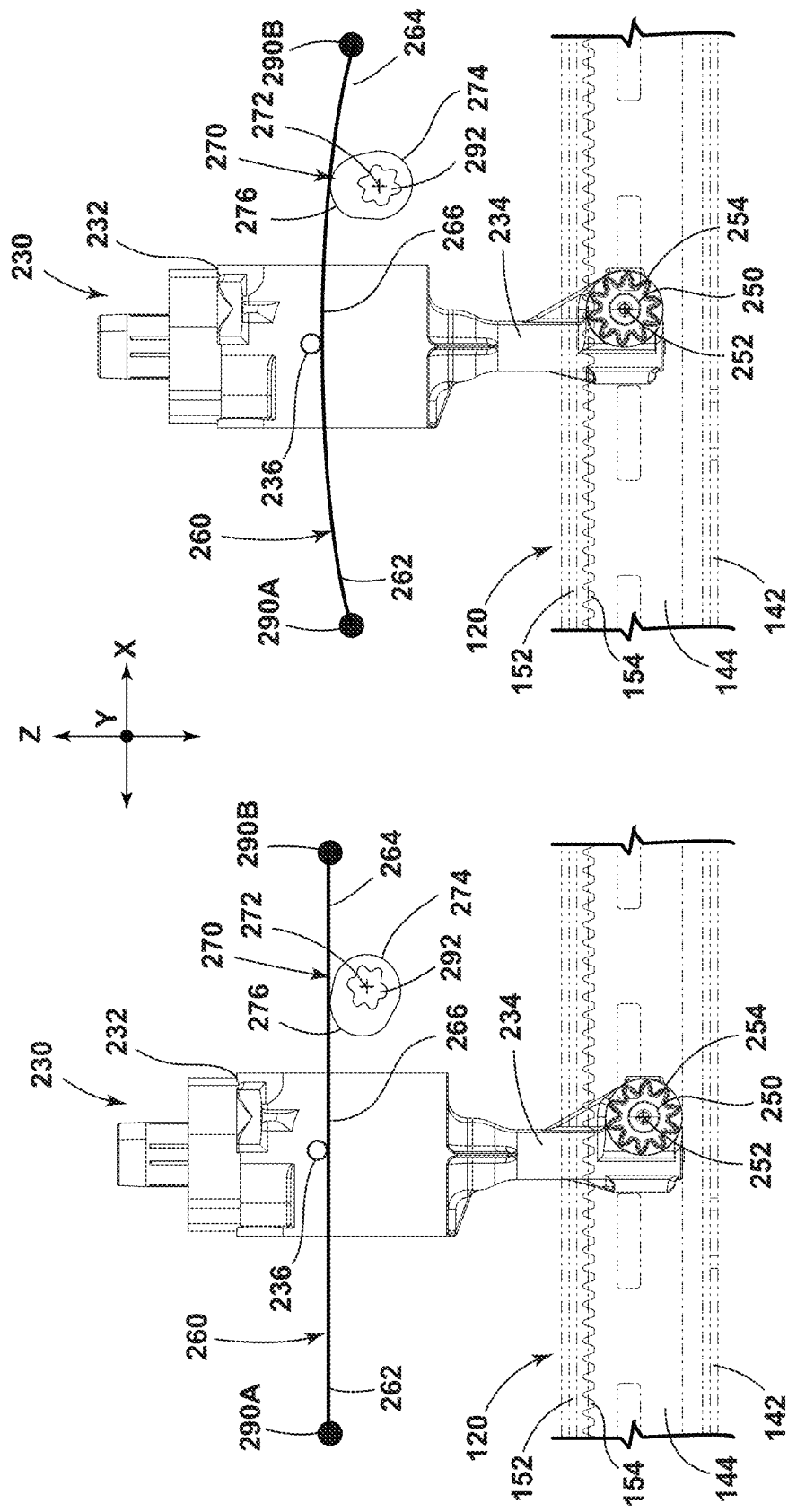
FIGS. 6A and 6B generally illustrate an embodiment of a support member in which a pinion is in a disengaged position and an engaged position, respectively, according to teachings of the present disclosure.
Figure 7:
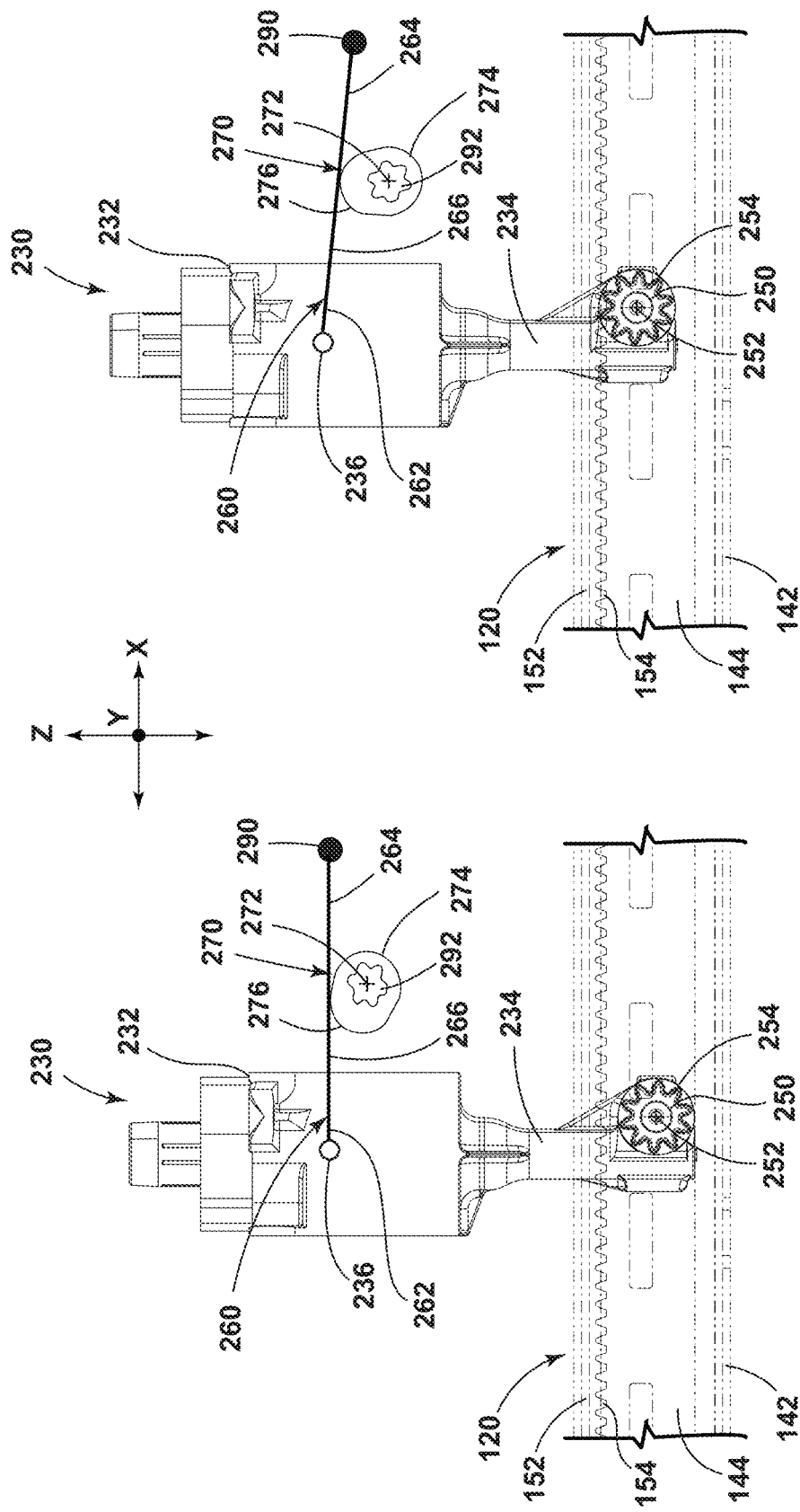
FIGS. 7A and 7B generally illustrate an embodiment of a support member in which a pinion is in a disengaged position and an engaged position, respectively, according to teachings of the present disclosure.
Figure 8:
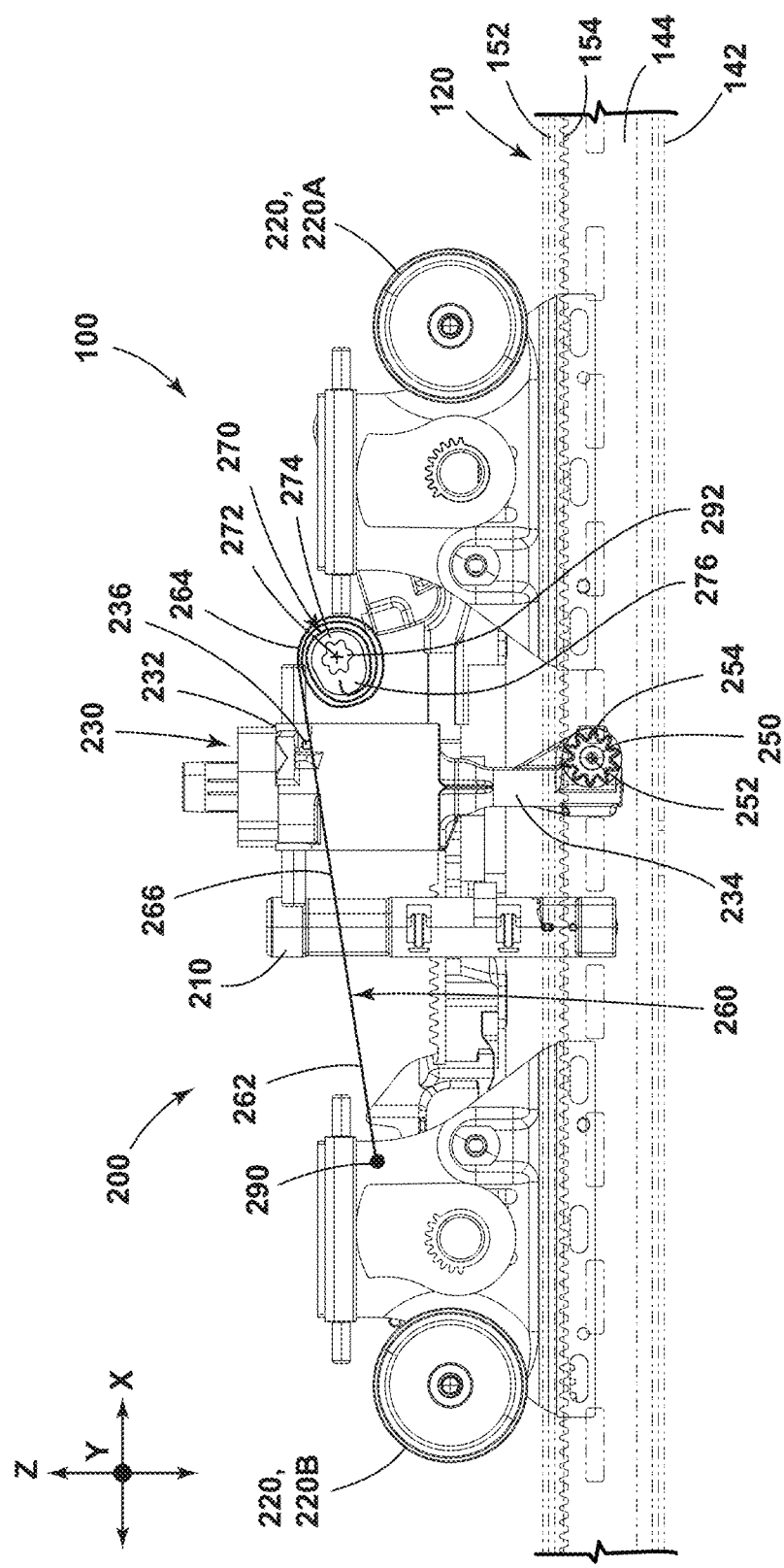
FIG. 8 is a side view generally illustrating an embodiment of a support member and track according to teachings of the present disclosure.

With embodiments, such as generally illustrated in FIGS. 1, 4 and 8, a support assembly 102 may include a support member 200. A support assembly 102 and/or a support member 200 may be adjusted and/or moved along a track 120 and/or the track assembly 104 (e.g., in an X-direction) manually and/or via an adjuster assembly 230. A support member 200 may be configured for connection with and removal (e.g., in a Z-direction) from a track assembly 104, such as in a plurality of locations along the track assembly 104. A support member 200 may, for example and without limitation, include, be connected to, and/or support a seat, such as a vehicle seat, and/or one or more other components (e.g., consoles, cargo, cargo racks, etc.). The support assembly, 102, the support member 200, and/or one or more components connected thereto may include one or more electrical components 202 (e.g., controllers, power sources, seat heaters, airbags, air bladders, fans, etc.). A support member 200 may be configured as a base, a leg, and/or a support structure, for example.

With embodiments, such as generally illustrated in FIGS. 4 and 8, a support member 200 may include one or more electrical connectors 210 that may be configured for selective connection with a track 120 of a track assembly 104. An electrical connector 210 may be configured to selectively electrically connect with a track assembly 104, such as with a conductor 160 (e.g., a bus bar) of the track assembly 104. For example, one or more contacts 212 of the electrical connector 210 may rotate into and out of contact with one or more conductors 160. Electrical connection between an electrical connector 210 and a conductor 160 may permit electrical power and/or one or more signals (e.g., control signals, sensor data signals, etc.) to be provided to and/or received from the support member 200 (e.g., an electrical component 202).

With embodiments, such as generally illustrated in FIGS. 1, 4, and/or 8, a support member 200 may include one or more rolling members 220. A rolling member 220 may be configured to engage and/or roll along a first rolling portion 146 and/or a second rolling portion 148 of a track 120. A support member 200 may be configured to move along a track 120, at least in part, via one or more rolling members 220 (e.g., rolling members 220A, 220B). In embodiments, a rolling member 220 may be configured to support at least a portion of the support assembly 102. A rolling member 220 may rotate as the support assembly 102 moves along the track assembly 104. A rolling member 220 may be rotatably connected to a body of the support member 200. For example and without limitation, a first rolling member 220A may be rotatably connected at or about a first end of a support member 200, and/or a second rolling member 220B may be rotatably connected at or about a second end of the support member 200. One or more rolling members 220 (e.g., first and second rolling members 220A, 220B) may be connected to the same lateral side of a support member 200 (see, e.g., FIGS. 4 and 8). In such embodiments, a first and second rolling member 220A, 220B may both engage and/or roll along the same rolling portion (e.g., a first rolling portion 146, a second rolling portion 148, etc.). Additionally and/or alternatively, a first rolling member 220A and a third rolling member 220C may be rotatably connected on opposite sides of an adjuster assembly 230 relative to a Y-direction, such that the first rolling member 220A may roll along a first rolling portion 146 and the third rolling member 220C may roll along a second rolling portion 148.

With embodiments, such as generally illustrated in FIGS. 1 and 4-14B, a support member 200 may include an adjuster assembly 230 configured to facilitate adjustment of the position (e.g., in an X-direction) of a support member 200 relative to a track 120. For example and without limitation, an electric motor 238 of the adjuster assembly 230 may rotate a pinion 250, which may engage the toothed portion 152 to adjust the position of the support member 200 relative to the track 120, such as in an X-direction. An adjuster assembly 230 may be adjustably connected to a body of the support member 200 such that the adjuster assembly 230 may move and/or float relative to the body of the support member 200, such as in a Z-direction. An adjuster assembly 230 may include an adjuster body 232 and/or an adjuster member 234. An adjuster member 234 may generally extend from an adjuster body 232 in a Z-direction (e.g., downward in a Z-direction toward a mounting surface 106). An adjuster assembly 230 may be operatively connected to an electrical component 202 of a support member 200, such as via wires 204. For example and without limitation, an electrical component 202 may provide power to and/or control operation of the electric motor 238. The electrical motor 238 may be disposed at least partially in the adjuster body 232 and/or in the adjuster member 234. Additionally and/or alternatively, an electrical motor 238 may be disposed within a support assembly 102 and/or may be operatively connected to one or more support members 200. For example and without limitation, a support assembly 102 may include (i) two or more support members 200 disposed opposite one another (e.g., relative generally to a Y-direction) and/or (ii) an electrical motor 238 disposed between the two support members 200 and connected to an adjuster assembly 230 of one or both of the two support members 200, such as via a respective flex shaft, which may be curved and/or bent in some examples. In some circumstances, a transmission may connect a motor 238 to an adjuster assembly 230.

With embodiments, such as generally illustrated in FIGS. 1 and 4-14B, an adjuster assembly 230 (e.g., an adjuster body 232 and/or an adjuster member 234) may include one or more portions (e.g., an adjuster portion 236, a flange 242, etc.) configured to contact and/or engage a flexible member 260 and/or an actuation body 330 of a support member 200. For example and without limitation, an adjuster portion 236 and/or a flange 242 may be configured as a protrusion extending from the adjuster body 232 (see, e.g., FIGS. 4-11B), such as generally in a Y-direction. Additionally and/or alternatively, an adjuster portion 236 and/or a flange 242 may be configured as a surface, edge, slot, recess, body, and/or any other structure configured to engage a flexible member 260 and/or an actuation body 330.

With embodiments, such as generally illustrated in FIGS. 1 and 4-14B, a support member 200 may include a pinion 250. A pinion 250 may be configured to engage a toothed portion 152 of a track assembly 104. A pinion 250 may be rotatable about a pinion axis 252, which may extend generally in a Y-direction (e.g., perpendicular to a longitudinal direction of the track 120). A pinion 250 may include one or more pinion teeth 254 configured to engage one or more track teeth 154 of a toothed portion 152. Pinion teeth 254 may extend radially from the pinion 250 relative to the pinion axis 252. A pinion 250 may be connected to an electric motor 238 directly and/or indirectly (e.g., via a flex shaft). For example and without limitation, a pinion 250 may be rotatably connected to an adjuster member 234, such as at a distal end of an adjuster member 234 that may be disposed opposite the adjuster body 232. An electric motor 238 may be operatively connected to a pinion 250 such that the pinion 250 is rotatable via the electric motor 238.

With embodiments, a pinion 250 (and the adjuster assembly 230, at least in some configurations) may be adjustable to an engaged position in which the pinion 250 is engaged with the toothed portion 152 (e.g., the pinion teeth 254 are engaged with the track teeth 154) and a disengaged position in which the pinion 250 is disengaged from/not engaged with the toothed portion 152 (e.g., the pinion teeth 254 are not engaged with the track teeth 154). A pinion 250 and/or the adjuster assembly 230 may, for example, be adjusted generally downward in a Z-direction toward the disengaged position and/or may be adjusted generally upward in a Z-direction toward the engaged position. When the pinion 250 is in the engaged position, operation of an electric motor 238 may cause rotation of the pinion 250 about a pinion axis 252 and the pinion teeth 254 to engage the toothed portion 152 of the track 120, which may cause movement of the support member 200 along the track 120. A pinion 250 and/or an adjuster assembly 230 may be configured to engage a track 120, such as via being inserted into a track receptacle 130 through a track opening 136.

With embodiments, such as generally illustrated in FIGS. 1 and 4-12B, a support member 200 may include a flexible member 260 configured to engage an adjuster assembly 230 and/or to facilitate adjustment of the pinion 250 and/or the adjuster assembly 230. A flexible member 260 may be configured to elastically deform (e.g., bend) when subjected to a force, such as when pressed via a command cam 270. A flexible member 260 may be configured as and/or include a spring blade (see, e.g., FIGS. 4-7B), a coil spring, and/or a strip spring (see, e.g., FIGS. 8-12B), for example. A flexible member 260 may include a first end 262, a second end 264, and/or an intermediate portion 266 disposed between the first end 262 and the second end 264. A first end 262 and/or a second end 264 may be connected to a support body 290 of a support member 200, a command cam 270 of a support member 200, a rotation shaft 292 of a support member 200, and/or an adjuster assembly 230 (e.g., an adjuster portion 236). In examples, a first end 262 and/or a second end 264 may be configured as a free end and may not be directly connected to any structure (e.g., may be suspended). A first end 262 and/or a second end 264 may be disposed on opposite sides of a pinion 250 and/or an adjuster assembly 230 relative to an X-direction. An intermediate portion 266 may engage an adjuster portion 236 in some examples. A flexible member 260 may be at least partially disposed on and/or wound around a command cam 270 and/or a rotation shaft 292. While embodiments are illustrated with flexible members 260 extending generally in a longitudinal direction (e.g., an X-direction), flexible members 260 may extend in other directions, such as in a transverse direction (e.g., a Y-direction), or at an angle between an X-direction and a Y-direction.

With embodiments, such as generally illustrated in FIGS. 5A-7B and 9A-12B, a flexible member 260 may be adjustable to a first flexible member position in which a pinion 250 is disposed in the disengaged position and/or to a second flexible member position in which a pinion 250 is disposed in the engaged position. Adjustment of a flexible member 260 toward the second flexible member position may move and/or adjust a pinion 250 upward in a Z-direction, which may increase a distance between an adjuster portion 236 and a track base portion 124. Adjustment of a flexible member 260 toward the first flexible member position may move and/or adjust a pinion 250 downward in a Z-direction, which may decrease a distance between an adjuster portion 236 and a track base portion 124. A flexible member 260 may be biased upward in a Z-direction (e.g., toward the second flexible member position) and, thus, bias a pinion 250 toward the engaged position (see, e.g., FIGS. 5A, 5B). In other embodiments, a flexible member 260 may be biased downward in a Z-direction (e.g., toward the first flexible member position, such as via gravity) and, thus, bias a pinion 250 into the disengaged position (see, e.g., FIGS. 6A, 6B). Additionally and/or alternatively, a flexible member 260 may be unbiased (see, e.g., FIGS. 7A, 7B, 9A-12B).

In embodiments, such as generally illustrated in FIG. 1, a support assembly 102 may include a first support member 200 that may be removably connected with a first track 120, and a second support member 200' that may be removably connected with a second track 120'. The first support member 200 may be connected to the second support member 200' via a cross member 206. The first support member 200 may include one or more wires 204, an adjuster assembly 230, an adjuster body 232, an adjuster member 234, an adjuster portion 236, rolling members 220A, 220C, a pinion 250, a pinion axis 252, pinion teeth 254, and/or a flexible member 260. The second support member 200' may include wires 204', an adjuster assembly 230', an adjuster body 232', an adjuster member 234', an adjuster portion 236', rolling members 220A', 220C', a pinion 250', a pinion axis 252', pinion teeth 254', and/or a flexible member 260', some or all of which may be configured in the same or similar manner as corresponding features of the first support member 200.

With embodiments, such as generally illustrated in FIGS. 4-11B, a support member 200 may include a command cam 270 configured to engage and/or adjust a flexible member 260. A command cam 270 may be rotatable about a rotation axis 272, which may extend generally in a Y-direction. A command cam 270 may include a cam hub 274 and/or a cam protrusion 276. A cam protrusion 276 may extend radially from a cam hub 274 relative to a rotation axis 272. A command cam 270 may be rotatably connected to a support member 200. In examples, a command cam 270 may be connected to a rotation shaft 292 of a support member 200, which may be configured to rotate the command cam 14 about the rotation axis 272. The rotation shaft 292 may, for example and without limitation, be actuated/rotated manually (e.g., via a lever/handle) and/or automatically (e.g., via an electromechanical actuator, such as a motor). In some configurations, a command cam 270 may be disposed above a flexible member 260 relative to a Z-direction. In other configurations, a command cam 270 may be disposed below a flexible member 260 relative to a Z-direction.

With embodiments, such as generally illustrated in FIGS. 5A-7B and 9A-11B, a command cam 270 may be adjustable to a first cam position and a second cam position. In the first cam position, the command cam 270 may engage (or not engage) the flexible member 260 such that the pinion 250 is in a disengaged position (e.g., the first cam position may correspond to a disengaged position of the pinion 250). In the second cam position, the command cam 270 may engage (or not engage) the flexible member 260 such that the pinion 250 is in an engaged position (e.g., the second cam position may correspond to an engaged position of the pinion 250). The configuration of the command cam 270 in the first cam position and the second cam position may vary in different embodiments, and may, for example, depend on the configuration and/or position of the flexible member 260 relative to the command cam 270.

With embodiments, a default position of the command cam 270 may be the first cam position such that the pinion 250 is disengaged from the track 120, which may, for example, facilitate more efficient removal of the support member 200 from the track assembly 102 (e.g., the pinion 250 may not need to move downward in the Z-direction before rotating/moving in a Y-direction). For example, the command cam 270 may be adjusted to the second cam position for controlling longitudinal adjustment of the support assembly 102 and may otherwise be disposed in the first cam position.

Figure 12B:
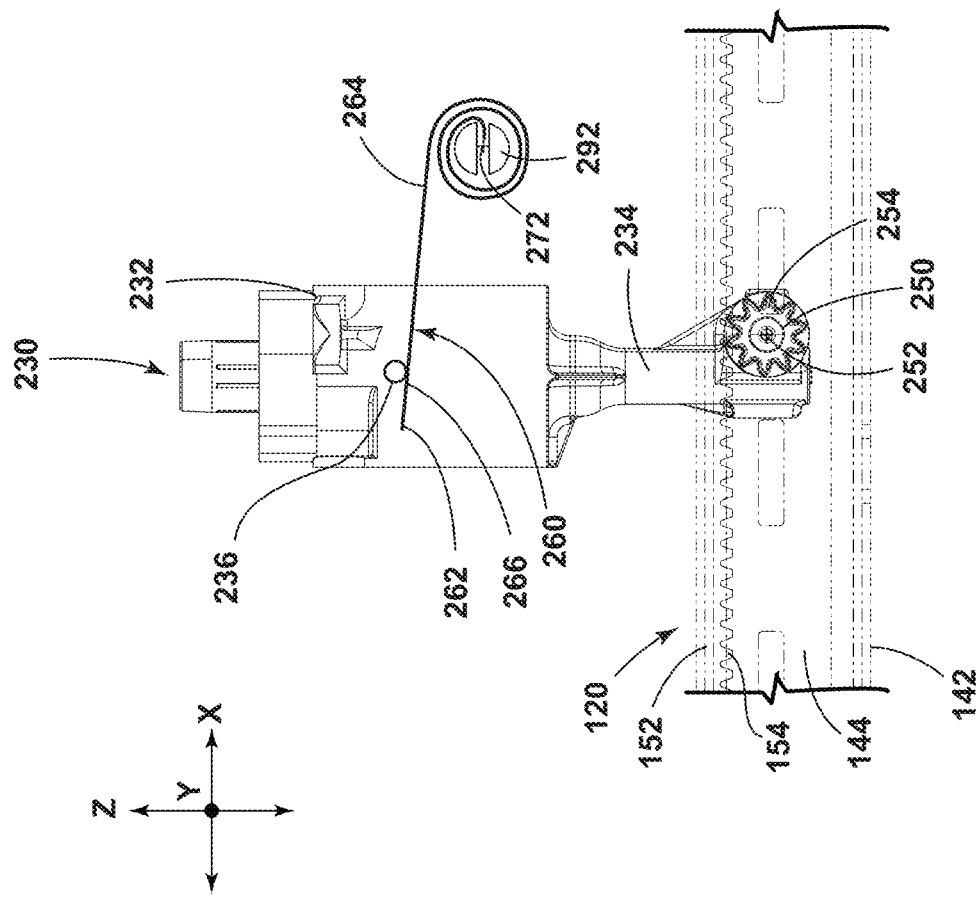
FIGS. 12A and 12B generally illustrate an embodiment of a support member in which a pinion is in a disengaged position and an engaged position, respectively, according to teachings of the present disclosure.
Figure 12A:
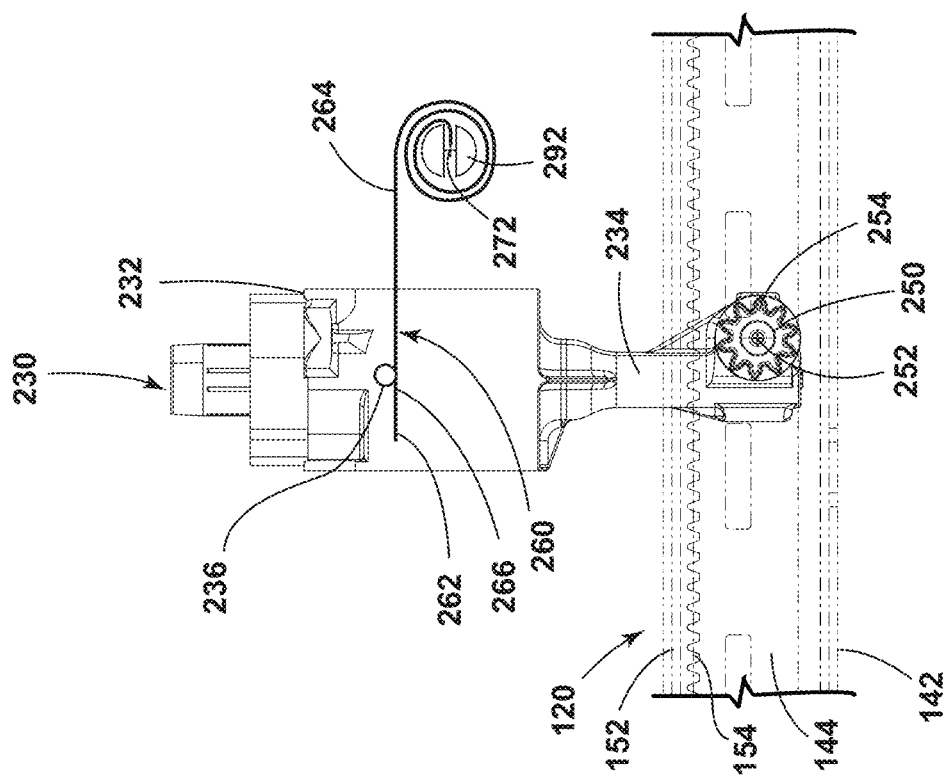

With embodiments, such as generally illustrated in FIGS. 12A and 12B, a support member 200 may not include a command cam 270, and/or a flexible member 260 may be connected (e.g., directly) to a rotation shaft 292. In such examples, a rotation shaft 292 may be adjustable to various positions, such as a first rotation shaft position and/or a second rotation shaft position, in a similar manner to a command cam 270.

With embodiments, such as generally illustrated in FIGS. 4, 5A, and 5B, a first end 262 of a flexible member 260 may be connected to a first support body 290A, a second end 264 of a flexible member 260 may be connected to a second support body 290B, an intermediate portion 266 of a flexible member 260 may engage an adjuster portion 236 of an adjuster assembly 230, and/or a command cam 270 may be disposed above the flexible member 260 in a Z-direction. The first support body 290A and/or the second support body 290B may be connected to and/or integrally formed with the support member 200. As generally illustrated in FIG. 5A, when a command cam 270 is disposed in the first cam position, the cam protrusion 276 may press against an intermediate portion 266 of a flexible member 260 and adjust (e.g., elastically bend) the flexible member 260 toward a first flexible member position such that the pinion 250 is in the disengaged position.

As generally illustrated in FIGS. 4 and 5B, when a command cam 270 is disposed in the second cam position, the cam protrusion 276 may not press against an intermediate portion 266 of a flexible member 260 (or may press against an intermediate portion 266 of a flexible member 260 to a lesser extent than when in the first cam position) such that the flexible member 260 is in the second flexible member position and/or the pinion 250 is in the engaged position. Adjustment of the command cam 270 toward the second cam position (see, e.g., FIGS. 4 and 5B), such as from the first cam position (see, e.g., FIG. 5A), may rotate the cam protrusion 276 away from the flexible member 260, which may reduce the amount of force applied to the flexible member 260 by the command cam 270, which may cause/allow the flexible member 260 to adjust toward the second flexible member position, which may cause the flexible member 260 to engage and/or press against the adjuster portion 236, which may cause the adjuster assembly 230 and/or the pinion 250 to move (e.g., upward in the Z-direction) toward the engaged position. In the first cam position, the cam protrusion 276 may extend more vertically upward than in the second cam position. For example and without limitation, in the first cam position, the cam protrusion 276 may extend substantially vertically (e.g., downward), and/or in the second cam position, the cam protrusion may extend substantially horizontally.

With other embodiments, such as generally illustrated in FIGS. 6A and 6B, a first end 262 of a flexible member 260 may be connected to a first support body 290A, a second end 264 of a flexible member 260 may be connected to a second support body 290B, an intermediate portion 266 of a flexible member 260 may engage an adjuster portion 236 of an adjuster assembly 230, and/or a command cam 270 may be disposed below the flexible member 260 in a Z-direction. As generally illustrated in FIG. 6A, when a command cam 270 is disposed in the first cam position, the cam protrusion 276 may not press against an intermediate portion 266 of a flexible member 260 (or may press against an intermediate portion 266 of a flexible member 260 to a lesser extent then when in the second cam position) such that the flexible member 260 is in a first flexible member position and the pinion 250 is in a disengaged position.

As generally illustrated in FIG. 6B, when a command cam 270 is disposed in the second cam position, the command cam 270 may press against an intermediate portion 266 of a flexible member 260 and/or elastically bend the flexible member 260 into a second flexible member position such that the pinion 250 is in the engaged position. Adjustment of the command cam 270 toward the second cam position (see, e.g., FIG. 6B), such as from the first cam position (see, e.g., FIG. 6A), may rotate the cam protrusion 276 toward from the flexible member 260, which may increase the amount of force applied to the flexible member 260 by the command cam 270, which may cause the flexible member 260 to adjust (e.g., elastically bend) toward the second flexible member position, which may cause the flexible member 260 to engage and/or press against the adjuster portion 236, which may cause the adjuster assembly 230 and/or the pinion 250 to move (e.g., upward in the Z-direction) toward an engaged position. In the second cam position, the cam protrusion 276 may extend more vertically upward than in the first cam position. For example and without limitation, in the first cam position, the cam protrusion 276 may extend substantially horizontally, and/or in the second cam position, the cam protrusion may extend substantially vertically.

With other embodiments, such as generally illustrated in FIGS. 7A and 7B, a first end 262 of a flexible member 260 may be connected (e.g., fixed) to an adjuster portion 236 of an adjuster assembly 230, a second end 264 of a flexible member 260 may be connected to a support body 290, and/or a command cam 270 may be disposed below the flexible member 260 in a Z-direction. As generally illustrated in FIG. 7A, when a command cam 270 is disposed in the first cam position, the cam protrusion 276 may not press against an intermediate portion 266 of a flexible member 260 (or may press against an intermediate portion 266 of a flexible member 260 to a lesser extent than when in the second cam position) such that the flexible member 260 is in a first flexible member position and the pinion 250 is in a disengaged position. As generally illustrated in FIG. 7B, when a command cam 270 is disposed in the second cam position, the command cam 270 may press against an intermediate portion 266 of a flexible member 260 and/or hold/retain the flexible member 260 in a second flexible member position such that the pinion 250 is in the engaged position. Adjustment of the command cam 270 toward the second cam position (see, e.g., FIG. 7B), such as from the first cam position (see, e.g., FIG. 7A), may rotate the cam protrusion 276 toward the flexible member 260, which may increase the amount of force applied to the flexible member 260 by the command cam 270, which may cause the flexible member 260 to adjust (e.g., rotate about the support body 290, deform, bend, etc.) toward the second flexible member position, which may cause the adjuster assembly 230 and/or the pinion 250 to move (e.g., upward in the Z-direction) toward an engaged position. In the second cam position, the cam protrusion 276 may extend more vertically upward than in the first cam position. For example and without limitation, in the first cam position, the cam protrusion 276 may extend substantially horizontally, and/or in the second cam position, the cam protrusion may extend substantially vertically.

With embodiments, such as generally illustrated in FIGS. 8, 9A, and 9B, a first end 262 of a flexible member 260 may be connected to a support body 290, a second end 264 of a flexible member 260 may be connected to a command cam 270, and/or an intermediate portion 266 of a flexible member 260 may engage an adjuster portion 236 of an adjuster assembly 230. As generally illustrated in FIG. 9A, when a command cam 270 is disposed in the first cam position, a flexible member 260 may be in a first flexible member position in which the flexible member 260 is partially wound around the command cam 270 such that the flexible member 260 is relatively loose (e.g., under relatively little tension compared to the second flexible member position) and/or the pinion 250 is in a disengaged position. As generally illustrated in FIGS. 8 and 9B, when a command cam 270 is disposed in the second cam position, a flexible member 260 may be in a second flexible member position in which the flexible member 260 is relatively tight/taut (e.g., under greater tension than in the first flexible member position) and/or the flexible member 260 may hold/retain the adjuster assembly 230 and/or the pinion 250 in the engaged position. Adjustment of the command cam 270 toward the second cam position (see, e.g., FIGS. 8 and 9B), such as from the first cam position (see, e.g., FIG. 9A), may rotate the cam protrusion 276, which may wind up the flexible member 260 around the command cam 270 (e.g., adjust the flexible member 260 toward the second flexible member position), which may increase a tension of the flexible member 260 and/or pull the flexible member 260 taut (e.g., reduce a length of the flexible member 260 between the command cam 270 and the support body 290), which may cause the flexible member 260 to engage and/or press against an underside of the adjuster portion 236, which may cause the adjuster assembly 230 and/or the pinion 250 to move (e.g., upward in the Z-direction) toward the engaged position.

Figures 10A, 10B:
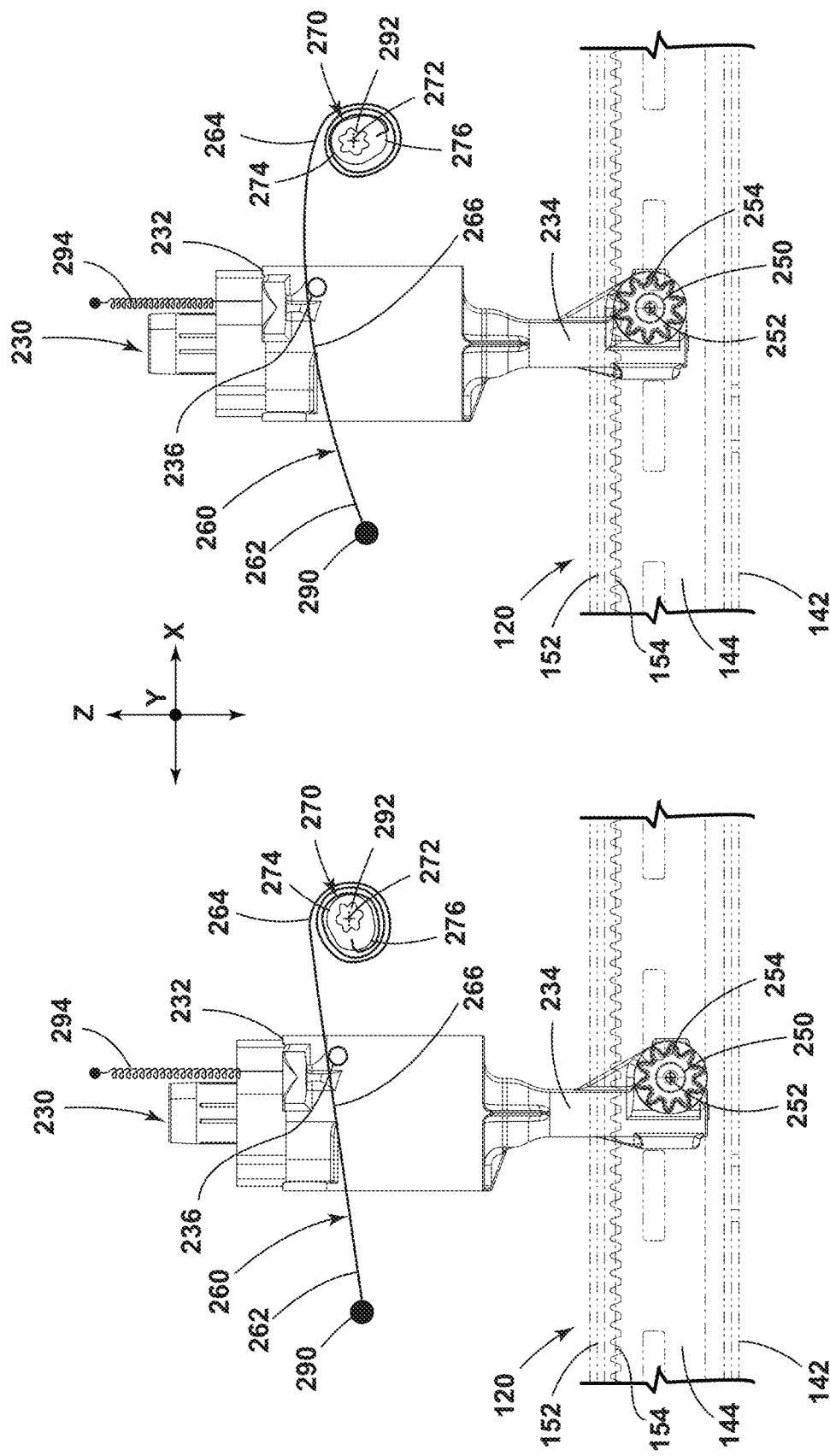
FIGS. 10A and 10B generally illustrate an embodiment of a support member in which a pinion is in a disengaged position and an engaged position, respectively, according to teachings of the present disclosure.

With embodiments, such as generally illustrated in FIGS. 10A and 10B, a first end 262 of a flexible member 260 may be connected to a support body 290, a second end 264 of a flexible member 260 may be connected to a command cam 270, and/or an intermediate portion 266 of a flexible member 260 may engage an adjuster portion 236 of an adjuster assembly 230. The adjuster assembly 230 and/or the pinion 250 may be biased toward the engaged position, such as via a biasing member 294 (e.g., a coil spring), for example. As generally illustrated in FIG. 10A, when a command cam 270 is disposed in the first cam position, a flexible member 260 may be in a first flexible member position in which the flexible member 260 is relatively tight/taut (e.g., under greater tension than in the second flexible member position), and/or the flexible member 260 may hold/retain the adjuster assembly 230 and/or the pinion 250 in the disengaged position (e.g., the flexible member may act against and overcome a biasing force provided by the biasing member 294). As generally illustrated in FIG. 10B, when a command cam 270 is disposed in the second cam position, a flexible member 260 may be in a second flexible member position in which the flexible member 260 is relatively loose (e.g., under relatively little tension and/or under less tension than in the first flexible member position), and the adjuster assembly 230 and/or the pinion 250 may be in the engaged position. Adjustment of the command cam 270 toward the second cam position (see, e.g., FIG. 10B), such as from the first cam position (see, e.g., FIG. 10A), may rotate the cam protrusion 276, which may unwind the flexible member 260 from the command cam 270 (e.g., adjust the flexible member 260 toward the second flexible member position), which may reduce a tension of the flexible member 260 (e.g., increase a length of the flexible member 260 between the command cam 270 and the support body 290), which may allow the adjuster assembly 230 and/or the pinion 250 to move (e.g., upward in the Z-direction), such as via a biasing member 294, toward the engaged position.

Figures 11A, 11B:
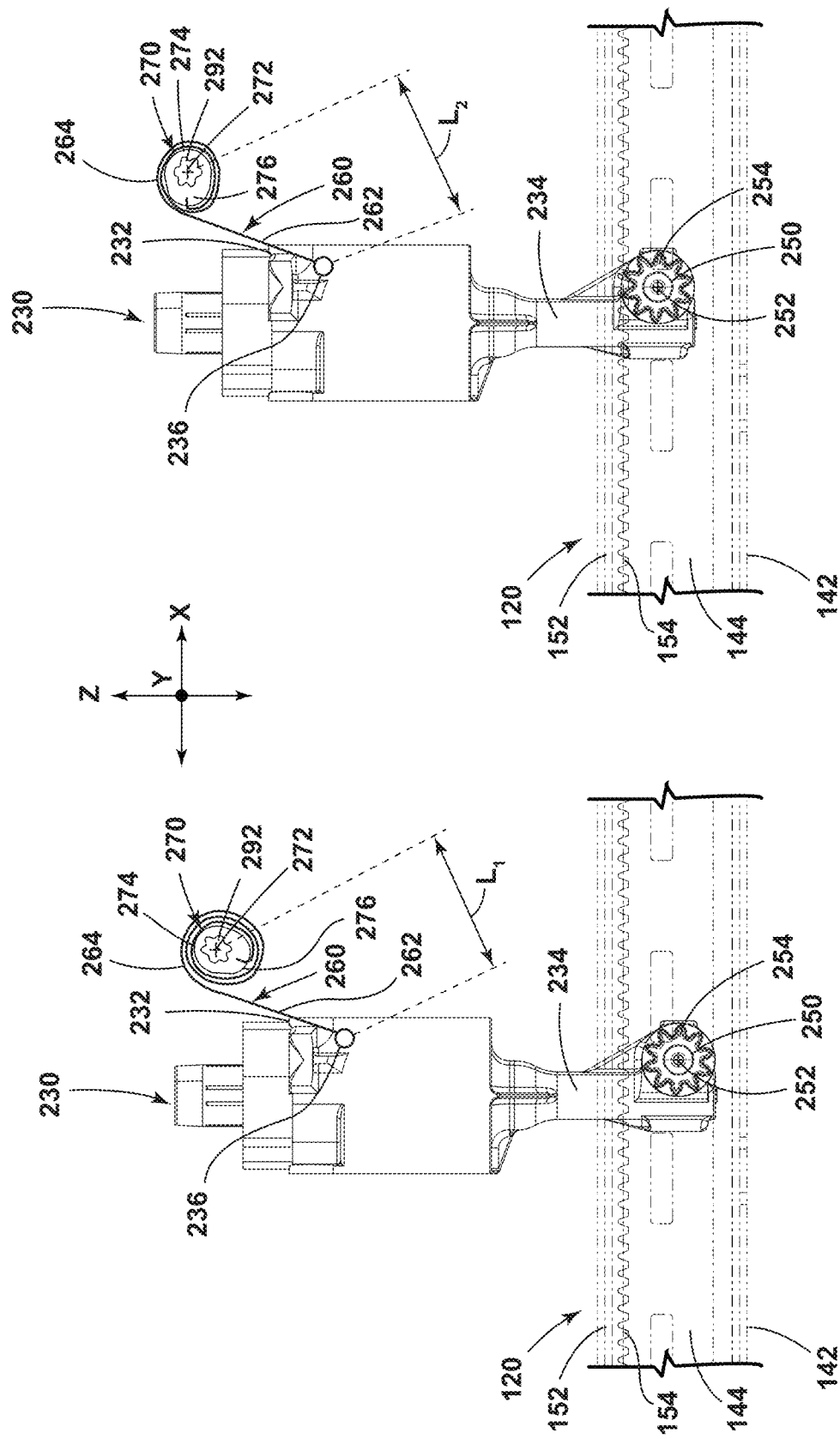
FIGS. 11A and 11B generally illustrate an embodiment of a support member in which a pinion is in a disengaged position and an engaged position, respectively, according to teachings of the present disclosure.

With embodiments, such as generally illustrated in FIGS. 11A and 11B, a first end 262 of a flexible member 260 may be connected to an adjuster portion 236 of an adjuster assembly 230 and/or a second end 264 of a flexible member 260 may be connected to a command cam 270. As generally illustrated in FIG. 11A, when a command cam 270 is disposed in the first cam position, a flexible member 260 may be in a first flexible member position in which the flexible member 260 is partially wound around the command cam 270 such that the flexible member 260 has a first length $L_1$ between the command cam 270 and the adjuster assembly 230, and/or the pinion 250 is in the disengaged position. As generally illustrated in FIG. 11B, when a command cam 270 is disposed in the second cam position, a flexible member 260 may be in a second flexible member position in which the flexible member 260 has a second length $L_2$ between the command cam 270 and the support body 290, which may be shorter than the first length $L_1$, and/or the flexible member 260 may hold/retain the adjuster assembly 230 and/or the pinion 250 in the engaged position. Adjustment of the command cam 270 toward the second cam position (see, e.g., FIG. 11B), such as from the first cam position (see, e.g., FIG. 11A), may rotate the cam protrusion 276, which may wind up the flexible member 260 around the command cam 270 (e.g., adjust the flexible member 260 toward the second flexible member position), which may reduce the length of the flexible member 260 between the command cam 270 and the support body 290, which may cause the adjuster assembly 230 and/or the pinion 250 to move (e.g., to be pulled upward in the Z-direction) toward the engaged position.

With embodiments, such as generally illustrated in FIGS. 12A and 12B, a first end 262 of a flexible member 260 may be a free end (e.g., may not be directly connected to a structure, may be suspended via the second end 264, etc) and/or a second end 264 of a flexible member 260 may be connected to a rotation shaft 292. As generally illustrated in FIG. 12A, when a rotation shaft 292 is disposed in a first rotation shaft position, a flexible member 260 may be in a first flexible member position, an intermediate portion 266 of a flexible member 260 may not press against an adjuster portion 236 of an adjuster assembly 230 (or may press against an adjuster portion 236 of an adjuster assembly 230 to a lesser extent than when in a second rotation shaft position) such that the pinion 250 is in a disengaged position. As generally illustrated in FIG. 12B, when a rotation shaft 292 is disposed in a second rotation shaft position, a flexible member 260 may be in a second flexible member position in which an intermediate portion 266 of the flexible member 260 may press against and/or may hold/retain the adjuster assembly 230 and/or the pinion 250 in the engaged position. Adjustment of a rotation shaft 292 toward a second rotation shaft position (see, e.g., FIG. 12B), such as from a first rotation shaft position (see, e.g., FIG. 12A), may rotate the rotation shaft 292 about a rotation axis 272, which may rotate the flexible member 260 around the rotation axis 272 (e.g., adjust the flexible member 260 toward the second flexible member position), which may cause a first end 262 and/or an intermediate portion 266 of the flexible member 260 to move farther away from a track base portion 124 of a track 120 and/or to contact (e.g., press against) an adjuster portion 236 of an adjuster assembly 230, which may cause the adjuster assembly 230 and/or a pinion 250 to move (e.g., to be pushed generally upward in the Z-direction) toward the engaged position.

Figure 14A:
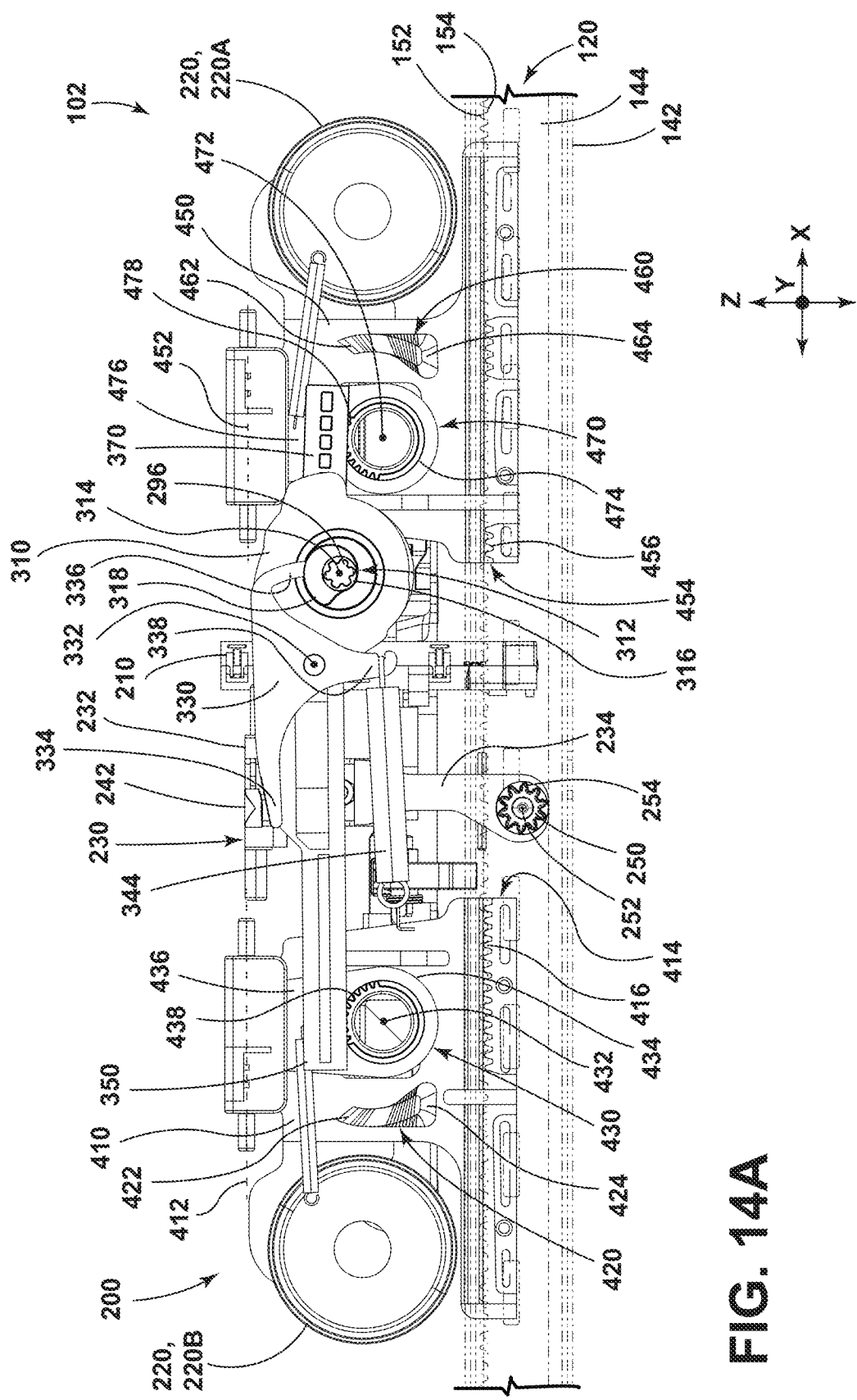
FIGS. 14A and 14B generally illustrate an embodiment of a support member in which an engagement cam is in a first engagement cam position and a second engagement cam position, respectively, according to teachings of the present disclosure.
Figure 14B:
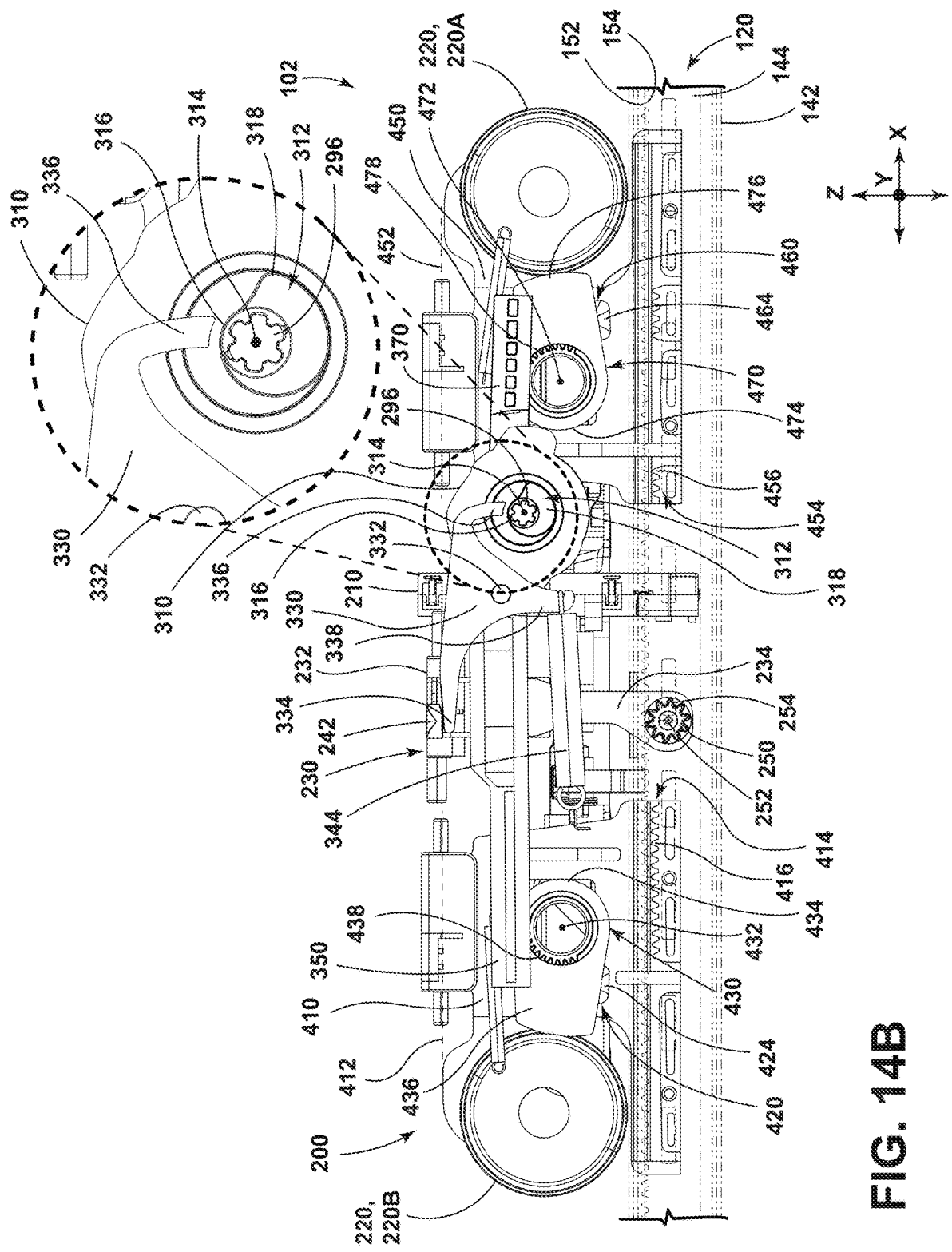

With embodiments, such as generally illustrated in FIGS. 14A and 14B, a support member 200 may include an engagement body 310 that may be configured to facilitate adjustment of one or more anchors 410, 450 into and/or out of engagement with a toothed portion 152 of a track assembly 104. A support member 200 may include an engagement cam 312 which may be configured to facilitate adjustment of the adjuster assembly 230 and/or a pinion 250 into and/or out of engagement with a track assembly 104. An engagement body 310 may be connected to an engagement cam 312. An engagement cam 312 may be rotatable about an engagement cam axis 314, which may extend generally in a Y-direction. An engagement cam 312 may include an engagement cam hub 316 and/or an engagement cam protrusion 318. An engagement cam protrusion 318 may extend radially from an engagement cam hub 316 relative to an engagement cam axis 314. An engagement body 310 and/or an engagement cam 312 may be rotatably connected to a support member 200. In examples, an engagement body 310 and/or an engagement cam 312 may be connected to an actuation shaft 296 of a support member 200, which may be configured to rotate the engagement cam 312 and/or the engagement body 310 about the engagement cam axis 314.

With embodiments, such as generally illustrated in FIGS. 14A and 14B, a support member 200 may include an actuation body 330. An actuation body 330 may have and/or be rotatable about an actuation body axis 332, which may extend generally in a Y-direction. An actuation body 330 may include a first actuation portion 334 configured to engage, contact, and/or abut an adjuster assembly 230, such as a flange 242, for example. An actuation body 330 may include a second actuation portion 336 configured to engage, contact, and/or abut an engagement cam 312 (e.g., an engagement cam protrusion 318). An actuation body 330 may include a third actuation portion 338, which may engage and/or be connected to a biasing member 344 (e.g., a spring). A biasing member 344 may, additionally and/or alternatively, be connected to a body of a support member 200, such as at an end opposite the actuation body 330. A biasing member 344 may bias an actuation body 330 about an actuation body axis 332, which may bias a second actuation portion 336 into contact with an engagement cam 312 and/or bias a pinion 250 toward engagement with a toothed portion 152.

Figure 13:
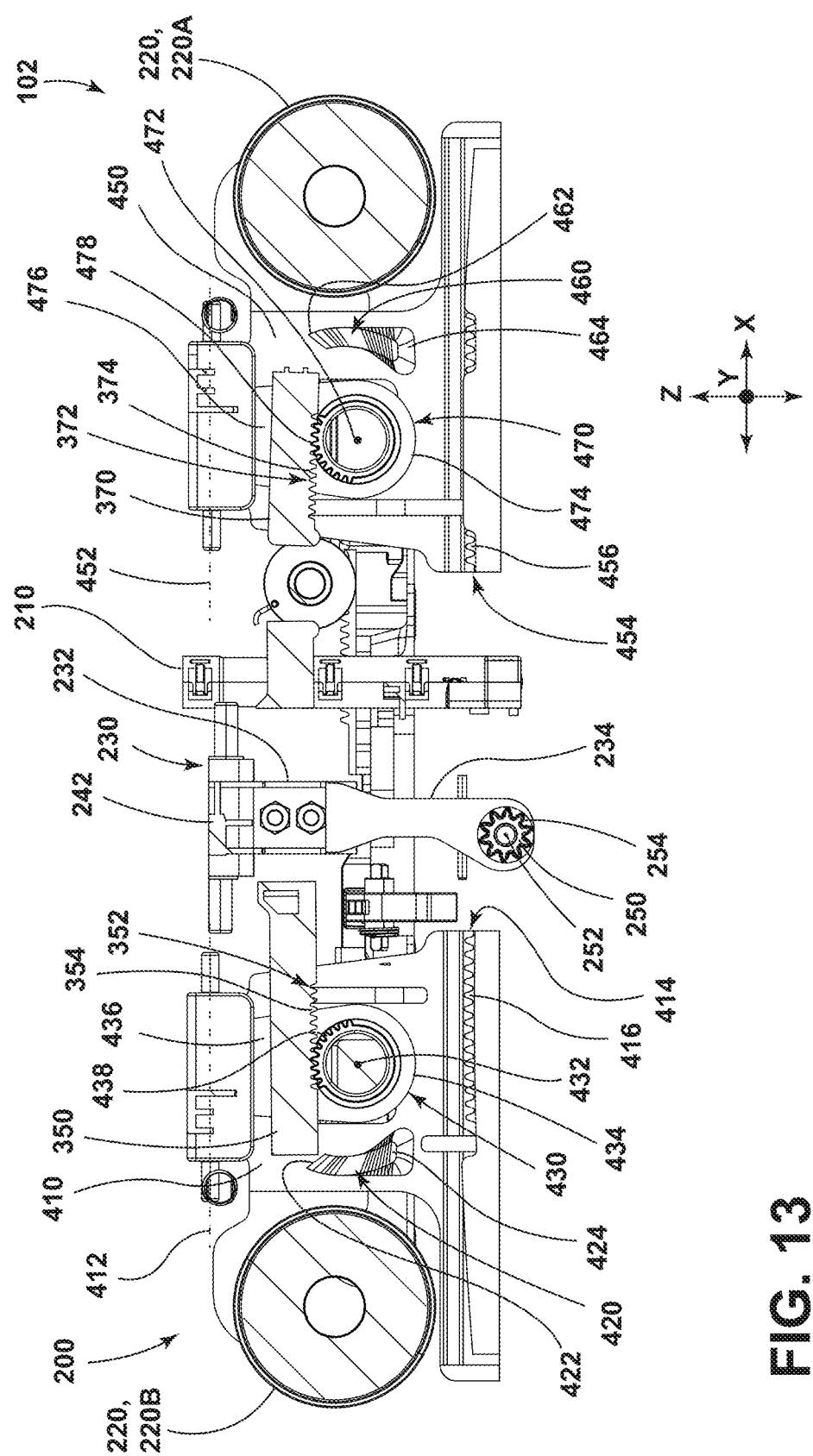
FIG. 13 is a cross-sectional side view generally illustrating an embodiment of a support member having an engagement member according to teachings of the present disclosure.

With embodiments, such as generally illustrated in FIGS. 13, 14A, and/or 14B, a support member 200 may include one or more engagement members (e.g., a first engagement member 350, a second engagement member 370) configured to engage an anchor cam 430, 470. An engagement member 350, 370 may be an elongated member, which may extend generally in an X-direction. An engagement member 350, 370 may include an engagement member toothed portion 352, 372 (e.g., gear racks), which may be configured to engage anchor cam teeth 438, 478 of an anchor cam 430, 470. An engagement member toothed portion 352, 372 may extend generally in an X-direction and/or may include one or more engagement member teeth 354, 374, which may be disposed one after another and/or aligned with one another in an X-direction. Engagement member teeth 354, 374 may extend and/or protrude from an engagement member 350, 370 and/or an engagement member toothed portion 352, 372 generally in a Z-direction (e.g., downward in the Z-direction toward the mounting surface 106). An engagement member 350, 370 may be operatively and/or adjustably connected to an engagement body 310, such as on an opposite side of the engagement body 310 from the engagement cam 312 for example. For example and without limitation, an engagement member 350, 370 may adjustably engage a slot or recess of the engagement body 310, which may be sloped toward an engagement cam axis 314, such that rotation of the engagement body 310 adjusts, moves, etc. the engagement member 350, 370 toward and/or away from the engagement cam axis 314. An engagement member 350, 370 may be operatively and/or adjustably connected to an anchor cam 430, 470. For example and without limitation, an engagement member 350, 370 may be adjusted, moved, slid, etc. generally in an X-direction via an engagement body 310, which may cause an engagement member toothed portion 352, 372 to engage and/or rotate an anchor cam 430, 470. A cross-sectional view through the engagement members 350, 370 of a support member 200 (e.g., in a plane perpendicular to a Y-direction) is depicted in FIG. 13 to provide a view of an engagement between the engagement members 350, 370 and the anchor cams 430, 470.

With embodiments, such as generally illustrated in FIGS. 13, 14A, and 14B, a support member 200 may include one or more anchors (e.g., a first anchor 410, a second anchor 450) configured to engage and/or connect, secure, fix, etc. a support member 200 to a track 120. An anchor 410, 450 may be adjustable generally in a Z-direction, may be adjustable generally in a Y-direction, and/or may be rotatable about an anchor axis 412, 452, which may extend generally in an X-direction and/or be adjustable in a Z-direction. An anchor 410, 450 may include one or more toothed anchor portions 414, 454 (e.g., gear racks) configured to engage a toothed portion 152 of a track 120. A toothed anchor portion 414, 454 may include one or more anchor teeth 416, 456. A toothed anchor portion 414, 454 may extend generally in an X-direction. One or more (e.g., all) of the anchor teeth 416, 456 may be disposed one after another and/or aligned with one another in an X-direction. Anchor teeth 416, 456 may extend and/or protrude from an anchor 410, 450 and/or a toothed anchor portion 414, 454 generally in a Z-direction (e.g., upward in the Z-direction away the mounting surface 106).

With embodiments, such as generally illustrated in FIGS. 13, 14A, and/or 14B, an anchor 410, 450 may include a ramp portion (e.g., a first anchor ramp portion 420, a second anchor ramp portion 460) configured to engage an anchor cam 430, 470. A ramp portion 420, 460 may project from an anchor 410, 450 generally in a Y-direction. A ramp portion 420, 460 may extend along an anchor 410, 450, such as from a first ramp end 422, 462 to a second ramp end 424, 464, in a curved manner. A first ramp end 422, 462 may be disposed above a second ramp end 424, 464 relative to a Z-direction, and/or a second ramp end 424, 464 may project farther from an anchor 410, 450 generally in a Y-direction than a first ramp end 422, 462, such that the ramp portion 420, 460 is sloped generally downward in a Z-direction and away from the anchor 410, 450 generally in a Y-direction.

With embodiments, such as generally illustrated in FIGS. 13, 14A, and 14B, a support member 200 and/or an anchor 410, 450 may include an anchor cam (e.g., a first anchor cam 430, a second anchor cam 470), which may be configured to engage and/or facilitate adjustment of an anchor 410, 450. An anchor cam 430, 470 may be rotatable about an anchor cam axis 432, 472, which may extend generally in a Y-direction. An anchor cam 430, 470 may include an anchor cam hub 434, 474 and/or an anchor cam protrusion 436, 476. An anchor cam protrusion 436, 476 may extend radially from an anchor cam hub 434, 474 relative to an anchor cam axis 432, 472. An anchor cam protrusion 436, 476 may be configured to contact, abut, and/or engage a ramp portion 420, 460 of an anchor 410, 450. An anchor cam 430, 470 may include on or more anchor cam teeth 438, 478, which may extend radially relative to an anchor cam axis 432, 472, via which an anchor cam 430, 470 may engage an engagement member toothed portion 352, 372 of an engagement member 350, 370. An anchor cam 430, 470 may be rotatably connected to a support member 200 and/or an anchor 410, 450. In examples, an anchor cam 430, 470 may be connected to an engagement member toothed portion 352, 372 of an engagement member 350, 370, which may be configured to rotate the anchor cam 430, 470 about an anchor cam axis 432, 472. Additionally and/or alternatively, an anchor cam 430, 470 may include a second anchor cam protrusion configured to contact a portion of an anchor 410, 450 (e.g., a surface, projection, ledge, etc.), which may facilitate adjustment of an anchor 410, 450 such as generally in a Z-direction.

With embodiments, such as generally illustrated in FIG. 14A, when an engagement cam 312 is in a first engagement cam position, an adjuster assembly 230 and/or an adjuster pinion 250 may be disengaged from a track 120, and/or a support member 200 may be secured (e.g., fixed) to a track 120 and adjustment and/or removal of a support member 200 from the track 120 may be restricted and/or prevented via an anchor 410, 450. In a first engagement cam position, a second actuation portion 336 may biased into contact with an engagement cam protrusion 318 (e.g., generally downward in a Z-direction), a first actuation portion 334 may (or may not) contact an adjuster assembly 230 (e.g., a flange 242), an adjuster assembly 230 and/or an adjuster pinion 250 may be disposed in a disengaged position, an anchor cam 430, 470 may be oriented such that an anchor cam protrusion 436, 476 does not contact (or contacts to a lesser extent than in the second engagement cam position) a ramp portion 420, 460, an anchor 410, 450 may be engaged with a toothed portion 152 of a track 120, and/or an adjuster pinion 250 may be disengaged from a toothed portion 152 of a track 120.

With embodiments, such as generally illustrated in FIG. 14B, when an engagement cam 312 is in a second engagement cam position, an adjuster assembly 230 and/or an adjuster pinion 250 may be engaged with a track 120, and/or removal of a support member 200 from a track 120 may be restricted and/or prevented via the adjuster assembly 230 (e.g., depending on the position of the adjuster assembly 230), and/or a support member 200 may be adjustable relative to the track 120, such as by actuating a motor 238 and/or rotating the adjuster pinion 250. In a second engagement cam position, a second actuation portion 336 may be disposed adjacent to and spaced apart from an engagement cam hub 316, a first actuation portion 334 may engage, contact, and/or press against an adjuster assembly 230 (e.g., a flange 242) such as generally in a Z-direction, an anchor cam 430, 470 may be oriented such that an anchor cam protrusion 436, 476 engages and/or contacts a ramp portion 420, 460, an anchor 410, 450 may be disengaged from a toothed portion 152 of a track 120 (e.g., disposed in a disengaged position), and/or an adjuster pinion 250 may be engaged with a toothed portion 152 of a track 120. Additionally and/or alternatively, a second actuation portion 336 may contact and/or be biased against an engagement cam hub 316 when an engagement cam 312 is in a second engagement cam position.

With embodiments, such as generally illustrated in FIGS. 14A and 14B, adjusting an adjuster pinion 250 and/or an adjuster assembly 230 toward an engaged position and/or a disengaged position may include adjusting an adjuster assembly 230 generally in a Z-direction, such as by rotating an actuation body 330 and/or an engagement cam 312. Adjusting (e.g., rotating) an engagement cam 312 may cause an actuation body 330 to rotate about an actuation body axis 332, which may cause the actuation body 330 to adjust, move, push, drop, etc. an adjuster assembly 230 generally in a Z-direction, which may cause the adjuster assembly 230 and/or an adjuster pinion 250 to adjust toward an engaged position and/or a disengaged position. Adjusting (e.g., rotating) an engagement cam 312 about an engagement cam axis 314 may, additionally, alternatively, and/or simultaneously, rotate an engagement body 310, which may cause an engagement member 350, 370 to adjust, move, slide, etc. generally in an X-direction, which may cause an anchor cam 430, 470 to rotate, which may cause an anchor 410, 450 to engage and/or disengage a toothed portion 152 of a track 120. By configuring an engagement cam 312 to simultaneously rotate an actuation body 330 and an engagement body 310 for example, an adjuster assembly 230 may be engaged and/or one or more anchors 410, 450 may be disengaged (or vice versa) by a single action (e.g., rotating an engagement cam 312), which may facilitate adjustment of a support assembly 102 on a track 120.

With embodiments, when adjusting an engagement cam 312 to adjust an adjuster assembly 230 and/or an adjuster pinion 250 toward an engaged position (see, e.g., FIG. 14B), for example from a disengaged position (see, e.g., FIG. 14A), an engagement cam 312 may be rotated (e.g., counter-clockwise) about an engagement cam axis 314, which may cause a second actuation portion 336 engaging an engagement cam protrusion 318 to adjust, move, slide, off of the engagement cam protrusion 318 (e.g., to a position in which the second actuation portion 336 is disposed spaced slightly apart from and/or in contact with an engagement cam hub 316), which may cause/allow the actuation body 330 to rotate (e.g., clockwise) about an actuation body axis 332, which may cause a first actuation portion 334 to move and/or adjust generally upward in a Z-direction such that it adjusts, presses, pushes, etc. a flange 242 of an adjuster assembly 230 generally upward in a Z-direction, which may cause the adjuster assembly 230 and/or an adjuster pinion 250 to move generally upward in a Z-direction to engage a toothed portion 152 of a track 120. When adjusting an engagement cam 312 to adjust the adjuster assembly 230 and/or the adjuster pinion 250 toward an engaged position (see, e.g., FIG. 14B), for example from a disengaged position (see, e.g., FIG. 14A), rotation of an engagement cam 312 about an engagement cam axis 314 may, additionally, alternatively, and/or simultaneously, cause an engagement body 310 to rotate (e.g., counter-clockwise) about an engagement cam axis 314 and/or about another axis extending generally in a Y-direction, which may adjust, move, slide, etc. an engagement member 350, 370 generally in an X-direction away from the engagement body 310, which may cause an engagement member toothed portion 352, 372 to engage, contact, etc. one or more anchor cam teeth 438, 478, which may cause an anchor cam 430, 470 to rotate about an anchor cam axis 432, 472, which may cause an anchor cam protrusion 436, 476 to slide along a ramp portion 420, 460 generally downward in a Z-direction toward a second ramp end 424, 464 (e.g., from a first ramp end 422, 462), which may adjust and/or move an anchor 410, 450 generally downward in a Z-direction and/or in a Y-direction (e.g., via rotating about an anchor axis 412, 452), which may cause an anchor toothed portion 414, 454 to disengage a toothed portion 152 of a track 120. Additionally and/or alternatively, rotating an anchor cam 430, 470 about an anchor cam axis 432, 472, may (i) cause a second anchor cam protrusion to engage and/or press against a portion (e.g., a projection) of the anchor 410, 450 to adjust an anchor 410, 450 generally downward in a Z-direction, and (ii) cause an anchor cam protrusion 436, 476 to engage and/or press against a ramp portion 420, 460 to adjust an anchor 410, 450 generally in a Y-direction away from a toothed portion 152 of a track 120. An engagement cam 312 and/or an actuation body 330 may be adjusted, moved, rotated, etc., in an opposite direction for example, to disengage the adjuster assembly 230 and/or an adjuster pinion 250 from a toothed portion 152 of a track assembly 104 (e.g., to adjust the adjuster assembly 230 from the position of FIG. 14A toward the position of FIG. 14B, which may involve the above described process being conducted in reverse.

With embodiments, a method of operating a track system 100 may include providing a track assembly 104 and one or more support assemblies 102. The support assembly 102 may be connected with a track 120 of the track assembly 104, such as from a vertical direction (e.g., a Z-direction). The support assembly 102 may include an adjuster assembly 230 and at least a portion of the adjuster assembly 230 (e.g., a pinion 250) may be adjusted/moved (e.g., rotated) into alignment with a toothed portion 152 of the track 120 such that the adjuster assembly 230 and/or the pinion 250 is disposed in a disengaged position. The command cam 270 may be rotated to adjust a position of a flexible member 260 relative to an adjuster portion 236 of the adjuster assembly 230 (e.g., to a first flexible member position, to a second flexible member position, etc.), which may move the adjuster assembly 230 upward and/or move the pinion 250 into an engaged position with the toothed portion 152. The adjuster assembly 230 and/or an electric motor 238 thereof may be actuated such that the pinion 250 rotates, which may move the support assembly 102 along and/or relative to the track 120. An electrical component 202 of the support assembly 102 may, for example, control operation of the electric motor 238. The command cam 270 may be rotated further or back to the first cam position, which may disengage the pinion 250 from the toothed portion 152. Removing the support assembly 102 from the track 120 may involve moving (e.g., rotating, shifting, etc.) the adjuster assembly 230 and/or the pinion 250 out of alignment with the toothed portion 152. Disengaging the adjuster assembly 230 from the toothed portion 152 (e.g., to the first/rest/default position) may facilitate removal of the support assembly 102. The adjuster assembly 230 may, for example and without limitation, be moved (e.g., rotated) into and out of alignment with the toothed portion 152 via a lever, a slider, and/or a motor. Additionally and/or alternatively, a method of operating a track system 100 may include adjusting at least a portion of the adjuster assembly 230 and/or an adjuster pinion 250 to an engaged position and/or to a disengaged position via adjusting an engagement body 310, an engagement cam 312, an actuation body 330, one or more engagement members 350, 370, one or more anchors 410, 450, and/or one or more anchor cams 430, 470 as previously described.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or nonfunctional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. A track system, comprising:
   a track;
   a support assembly including a support member removably and adjustably connected to the track; and
   a flexible member connected to the support member;
   wherein the support member includes a pinion;
   wherein the flexible member is adjustable to a first flexible member position in which the pinion and the track are not engaged with one another; and
   wherein the flexible member is adjustable to a second flexible member position in which the pinion and the track are engaged with one another.

2. The track system of claim 1, wherein:
   the support member includes an adjuster assembly operatively connected to the pinion; and
   the adjuster assembly includes a portion configured to engage the flexible member and facilitate adjustment of the pinion via the flexible member.

3. The track system of claim 2, wherein:
   the flexible member includes a first end, a second end, and an intermediate portion disposed between the first end and the second end; and
   the portion of the adjuster assembly is engaged with the intermediate portion of the flexible member and is disposed closer to the track when the flexible member is in the first flexible member position than when the flexible member is in the second flexible member position.

4. The track system of claim 1, wherein the flexible member includes a strip spring or a spring blade.

5. The track system of claim 1, including a cam rotatably connected to the support member and configured to rotate to adjust the flexible member.

6. The track system of claim 5, wherein the flexible member is at least partially wound around the cam.

7. The track system of claim 5, wherein the cam is configured such that rotation of the cam adjusts a tension of the flexible member.

8. The track system of claim 5, wherein:
   the track extends in an X-direction;
   the cam is rotatable to a first cam position, in which a cam protrusion of the cam extends in a first direction, and to a second cam position, in which the cam protrusion extends in a second direction; and
   the cam is configured to press the flexible member toward the first flexible member position to disengage the pinion from the track.

9. The track system of claim 8, wherein the flexible member is configured to elastically bend when pressed via the cam.

10. The track system of claim 5, wherein:
    the flexible member includes a first end, a second end, and an intermediate portion disposed between the first end and the second end;
    the first end and the second end of the flexible member are connected to the support member on opposite sides of the pinion; and the intermediate portion of the flexible member is disposed in contact with the cam at least when the flexible member is in the first flexible member position.

11. The track system of claim 1, including a cam rotatably connected to the support member and configured to rotate to adjust the flexible member;
wherein the flexible member includes a first end connected to the support member, a second end connected to the cam, and an intermediate portion disposed between the first end and the second end;
the flexible member is at least partially wound around the cam; and
the cam is configured to rotate to adjust the flexible member.

12. The track system of claim 11, wherein the cam is rotatable to a first cam position, in which the flexible member is disposed in the first flexible member position, and to a second cam position, in which the flexible member is disposed in the second flexible member position; and
the cam is configured such that rotation of the cam toward the first cam position increases a length of the flexible member between the first end and the cam.

13. A method of operating the track system of claim 1, the method comprising:
connecting the support member and the track; and
engaging the pinion and the track via adjusting the flexible member from the first flexible member position to the second flexible member position.

14. The method of claim 13, wherein adjusting the flexible member from the first flexible member position to the second flexible member position includes:
engaging the flexible member with a portion of an adjuster assembly of the support member, the adjuster assembly operatively connected to the pinion; and
adjusting a position of the portion of the adjuster assembly relative to the track via the flexible member.

15. The method of claim 13, wherein adjusting the flexible member from the first flexible member position to the second flexible member position includes adjusting a tension of the flexible member.

16. The method of claim 13, wherein adjusting the flexible member from the first flexible member position to the second flexible member position includes rotating a cam to at least partially wind or unwind the flexible member around the cam.

17. The method of claim 13, wherein:
when the flexible member is in the first flexible member position, a cam presses on the flexible member and bends the flexible member toward or away from the track; and
adjusting the flexible member from the first flexible member position to the second flexible member position includes rotating a cam such that the cam presses on and bends the flexible member one of (i) to a lesser extent than when the flexible member is in the first flexible member position and (ii) to a greater extent than when the flexible member is in the first flexible member position.

18. A track system, comprising:
a track including a toothed portion having a plurality of track teeth; and
a support assembly including a support member removably and adjustably connected to the track;
wherein the support member includes a pinion having a plurality of pinion teeth configured to engage the plurality of track teeth;
the pinion is adjustable to an engaged position in which the pinion and the toothed portion are engaged with one another;
the pinion is adjustable to a disengaged position in which the pinion and the toothed portion are not engaged with one another;
the support member includes an actuation body configured to rotate to adjust the pinion toward the engaged position and/or toward the disengaged position; and
the support member includes an engagement cam configured to selectively contact the actuation body to rotate the actuation body and adjust the pinion toward the engaged position or toward the disengaged position.

19. The track system of claim 18, wherein:
the support member includes an adjuster assembly that includes the pinion;
the actuation body includes a first actuation portion configured to contact the adjuster assembly; and
the actuation body includes a second actuation portion configured to contact the engagement cam.

20. The track system of claim 19, wherein:
the engagement cam includes an engagement cam hub and an engagement cam protrusion extending from the engagement cam hub;
the engagement cam is adjustable to a first engagement cam position and to a second engagement cam position; and
the engagement cam protrusion is configured to disengage from the second actuation portion when the engagement cam is adjusted to the second engagement cam position such that the first actuation portion engages the adjuster assembly and moves the pinion to the engaged position.

* * * * *